United States Patent
Shimizu et al.

(10) Patent No.: US 8,446,854 B2
(45) Date of Patent: May 21, 2013

(54) SIGNAL PROCESSING APPARATUS, SIGNAL PROCESSING METHOD, AND RECEPTION SYSTEM

(75) Inventors: Kazuhiro Shimizu, Kanagawa (JP); Takashi Yokokawa, Kanagawa (JP); John Wilson, Hampshire (GB); Samuel Atungsiri, Hampshire (GB)

(73) Assignee: Sony Corporation, Tokyo (JP)

( * ) Notice: Subject to any disclaimer, the term of this patent is extended or adjusted under 35 U.S.C. 154(b) by 384 days.

(21) Appl. No.: 12/852,003

(22) Filed: Aug. 6, 2010

(65) Prior Publication Data
US 2011/0038385 A1    Feb. 17, 2011

(30) Foreign Application Priority Data
Aug. 13, 2009   (JP) .............................. P2009-187804

(51) Int. Cl.
*H04W 92/00*    (2009.01)

(52) U.S. Cl.
USPC .................. 370/316; 370/473; 370/474

(58) Field of Classification Search
None
See application file for complete search history.

(56) References Cited

U.S. PATENT DOCUMENTS

| | | | |
|---|---|---|---|
| 8,009,685 B2 * | 8/2011 | Himmanen et al. | 370/410 |
| 2004/0032825 A1 * | 2/2004 | Halford et al. | 370/208 |
| 2009/0196217 A1 * | 8/2009 | Himmanen et al. | 370/328 |
| 2010/0309972 A1 * | 12/2010 | Kawauchi | 375/240.01 |

OTHER PUBLICATIONS

ETSI; "Digital Video Broadcasting (DVB); Implementation guidelines for a second generation digital terrestrial television broadcasting system (DVB-T2)"; Jan. 2009; ETSI; V0.9.6; pp. 1-195.*

DVB Organization: "T2_0447_TR_102831_DVB-T2_Implementation_Guidelines_0_9_6. doc", DVB, Digital Video Broadcasting, C/O EBU—17A Ancienne Route—CH-1218 Grand Saconnex, Geneva—Switzerland, Feb. 20, 2009, XP017817721.

Jokela T et al: "Robustness analysis of physical layer signaling transmission in DVB-T2", Broadband Multimedia Systems and Broadcasting, 2009. BMSB '09. IEEE International Symposium on, IEEE, Piscataway, NJ, USA, May 13, 2009, pp. 1-5, XP031480140, ISBN: 978-1-4244-2590-7.

DVB Project: "Frame structure channel coding and modulation for a second generation digital terrestrial television broadcasting system (DVB-T2)", Internet Citation, Jun. 2008, pp. 1-158, XP002546005, Retrieved from the Internet: URL:http://www.dvb.org/technology/dvbt2/a122.tm3980r5.DVB-T2.pdf [retrieved on Sep. 15, 2009].

DVB BlueBook A122 Rev. 1, Frame Structure Channel Coding and Modulation for a Second Generation Digital Terrestrial Television Broadcasting System (DVB-T2).

* cited by examiner

*Primary Examiner* — Robert Scheibel
(74) *Attorney, Agent, or Firm* — Oblon, Spivak, McClelland, Maier & Neustadt, L.L.P.

(57) ABSTRACT

Disclosed herein is a signal processing apparatus including a first detection block; a second detection block; a duration detection block; a duration information output block; and a demodulation block.

18 Claims, 16 Drawing Sheets

SIGNAL PROCESSING APPARATUS, SIGNAL PROCESSING METHOD, AND RECEPTION SYSTEM

BACKGROUND OF THE INVENTION

1. Field of the Invention

The present invention relates to a signal processing apparatus, a signal processing method, and a reception system. More particularly, the invention relates to a signal processing apparatus, a signal processing method, and a reception system adapted to reduce the scale of circuitry and lower power dissipation.

2. Description of the Related Art

Recent years have witnessed widespread use of a modulation scheme called orthogonal frequency division multiplexing (OFDM) for transmitting digital signals. The OFDM scheme involves having numerous orthogonal subcarriers furnished within the transmission bandwidth and assigning data to the amplitude and phase of each of the subcarriers for digital modulation through PSK (Phase Shift Keying) and QAM (Quadrature Amplitude Modulation). OFDM time domain signals are transmitted in units of symbols called OFDM symbols.

The OFDM scheme is applied extensively to terrestrial wave digital broadcasts that are highly susceptible to multipath interference. The terrestrial wave digital broadcasts adopting the OFDM scheme are subject to standards such as DVB-T (Digital Video Broadcasting-Terrestrial) and ISDB-T (Integrated Services Digital Broadcasting-Terrestrial).

Meanwhile, ETSI (European Telecommunication Standard Institute) is currently working on DVB (Digital Video Broadcasting)-T2 as a next-generation terrestrial digital broadcasting standard (see "DVB Bluebook A122 Rev. 1, Frame structure channel coding and modulation for a second generation digital terrestrial television broadcasting system (DVB-T2); disclosed at the DVB website updated Sept. 1, 2008; called the non-patent document 1 hereunder).

According to DVB-T2, data is transmitted in units of transmission frames called T2 frames. Also according to DVB-T2, the T2 frame is transmitted multiplexed with a signal called FEF (Future Extension Frame) having a structure different from that of the T2 frame.

Generally, upon receipt of a signal stream transmitted multiplexed with signals each having a different structure based on a different scheme, reception apparatuses each compatible with a different signal type detect and receive the corresponding signal independently. Under DVB-T2, a reception apparatus for receiving T2 frames and a reception apparatus for receiving FEFs detect and receive the relevant signal independently.

FIG. 1 is a schematic view showing a typical frame structure according to DVB-T2.

Under DVB-T2, as indicated in FIG. 1, T2 frames and FEF parts are multiplexed when transmitted. Specifically, each FEF part multiplexed with T2 frames has a predetermined length (FEF length) and is transmitted at predetermined intervals (FEF intervals) each made up of a plurality of T2 frames.

The T2 frames and FEF parts each have a P1 OFDM symbol (which may simply be called the symbol hereunder). P1, along with P2 to be discussed later, is a preamble signal that contains information necessary for such processing as demodulation of the OFDM signal.

P1 has identification information error-correcting-coded therein (i.e., it holds signaling information) for determining whether the frame in question is a T2 frame or an FEF part.

It follows that the reception apparatus for receiving T2 frames and the reception apparatus for receiving FEF parts can each detect T2 frames or FEF parts for demodulation by acquiring the information contained in P1 while excluding the influence of the irrelevant elements for enhanced demodulation performance.

When a given frame is a T2 frame, P1 holds other signaling information. This information, desired for demodulation purposes, typically includes the FFT size for performing FFT computations of symbols other than P1 (i.e., FFT size is the number of samples (symbols) subject to a single FFT computation). That is, if the frame of interest is a T2 frame, then P1 includes such information as the FFT size and transmission mode necessary for demodulating P2. It follows that to demodulate P2 desires demodulating P1 first.

In the T2 frame, the P1 symbol is followed by P2 symbols, symbols called "Normal" each, and a symbol called FC (Frame Closing), in that order.

Each OFDM symbol is generally made up of an effective symbol and a guard interval. The effective symbol constitutes a signal period in which IFFT is carried out upon demodulation. The guard interval is formed by having a partial waveform of the latter portion of the effective symbol copied unmodified to the beginning of the effective symbol. In FIG. 1, each guard interval is indicated as GI; P1 does not have any GI.

P2 holds L1 pre-signaling (L1 PRE) and L1 post-signaling (L1 POST).

The L1 pre-signaling includes information necessary for demodulating the L1 post-signaling. The L1 post-signaling includes information desired by each reception apparatus for access to the physical layer (i.e., to the layer pipes).

The L1 pre-signaling includes such information as the GI length, a pilot pattern (PP) representative of pilot signal locations indicating which symbols (subcarriers) contain pilot signals as known signals, the presence or absence of a transmission bandwidth extension (BWT_EXT) for transmitting the OFDM signal, and the number of OFDM symbols included in one T2 frame (NDSYM). These pieces of information included in the L1 pre-signaling constitute information necessary for demodulating data symbols (including FC).

The L1 pre-signaling further includes information giving more details of an FEF duration (FEF length, FEF interval, etc., shown in FIG. 1), as well as related information indicative of the FEF type (FEF_Type).

Thus the reception apparatus for receiving T2 frames and the reception apparatus for receiving FEFs can each detect T2 frames or FEF parts with more precision for demodulation purposes by acquiring the information from within P2, at the same time excluding more accurately the influence of the irrelevant elements for enhanced demodulation performance.

In the example of FIG. 1, two P2s are shown located in one T2 frame. In practice, each T2 frame may accommodate 1 through 16 P2s as OFDM symbols.

SUMMARY OF THE INVENTION

Where a signal stream is transmitted multiplexed with a plurality of signals each having a different structure based on a different scheme, reception apparatuses each compatible with a different signal type are to detect and receive the corresponding signal independently. In such cases, each reception apparatus is generally desired to possess its own arrangements for the detection, synchronous reproduction, and demodulation of the signal of interest.

DVB-T2 makes no exception to the above rule. Under DVB-T2, each reception apparatus for receiving T2 frames or for receiving FEFs is desired to have the necessary arrangements for synchronously reproducing and demodulating the multiplexed signal being received.

However, some processes such as those for detecting P1 and P2 from the received multiplexed signal and acquiring the signaling information therefrom are common to the reception apparatus for T2 frame reception and to the reception apparatus for FEF reception. That means there exists a redundancy of processing arrangements incorporated in different types of reception apparatuses.

The embodiments of the present invention have been made in view of the above circumstances and provide a signal processing apparatus, a signal processing method, and a reception system adapted to reduce the scale of circuitry and lower power dissipation.

In carrying out the present invention and according to one embodiment thereof, there is provided a signal processing apparatus including first detection means for detecting a first preamble signal from a multiplexed signal composed of a plurality of signals each holding the first preamble signal and having a different structure; second detection means configured such that if information which is included in the first preamble signal detected by the first detection means and which identifies each of the plurality of signals indicates a first signal, then the second detection means detects a second preamble signal following the first preamble signal; duration detection means for detecting a duration of the second signal in the multiplexed signal based on information included in the second preamble signal detected by the second detection means; duration information output means for outputting information about the second signal duration detected by the duration detection means, to another signal processing apparatus configured to demodulate one of the first and the second signals in the multiplexed signal; and demodulation means for demodulating the other of the first and the second signals in the multiplexed signal based on the information included in the first preamble signal, on the information included in the second preamble signal, and on the information about the second signal duration detected by the duration detection means.

Preferably, the signal processing apparatus of the invention may further include A/D conversion means for converting the multiplexed signal into a digital signal.

Preferably, the signal processing apparatus of the invention may further include signal output means for outputting the digital signal converted by the A/D conversion means to that another signal processing apparatus.

Preferably, the signal processing apparatus of the invention may further include first information output means for outputting the information included in the second preamble signal to that another signal processing apparatus.

Preferably, the signal processing apparatus of the invention may further include second information output means for outputting the information included in the first preamble signal to that another signal processing apparatus.

According to another embodiment of the present invention, there is provided a signal processing method including the steps of causing a signal processing apparatus to detect a first preamble signal from a multiplexed signal composed of a plurality of signals each holding the first preamble signal and having a different structure; if information which is included in the detected first preamble signal and which identifies each of the plurality of signals indicates a first signal, then causing the signal processing apparatus to detect a second preamble signal following the first preamble signal; causing the signal processing apparatus to detect a duration of a second signal in the multiplexed signal based on information included in the detected second preamble signal; causing the signal processing apparatus to output information about the detected second signal duration to another signal processing apparatus configured to demodulate one of the first and the second signals in the multiplexed signal; and causing the signal processing apparatus to demodulate the other of the first and the second signals in the multiplexed signal based on the information included in the first preamble signal, on the information included in the second preamble signal, and on the information about the second signal duration.

According to a further embodiment of the present invention, there is provided a signal processing apparatus including duration information input means configured such that if information which is included in a first preamble signal detected from a multiplexed signal composed of a plurality of signals each holding the first preamble signal and having a different structure and which identifies each of the plurality of signals indicates a first signal, then the duration information input means inputs information about a duration of a second signal detected from the multiplexed signal based on information included in a second preamble signal detected following the first preamble signal, the information about the second signal duration being input from another signal processing apparatus configured to demodulate one of the first and the second signals in the multiplexed signal; and demodulation means for demodulating the other of the first and the second signals in the multiplexed signal based on the second signal duration information input through the information input means.

Preferably, the signal processing apparatus of the invention may further include A/D conversion means for converting the multiplexed signal into a digital signal; wherein the demodulation means may demodulate the other signal in the multiplexed signal using the digital signal converted by the A/D conversion means.

Preferably, the signal processing apparatus of the invention may further include signal input means for inputting a digital signal converted from the multiplexed signal from that another signal processing apparatus; wherein the demodulation means may demodulate the other signal in the multiplexed signal using the digital signal input through the signal input block.

Preferably, the signal processing apparatus of the invention may further include first information input means for inputting the information included in the second preamble signal from that another signal processing apparatus; wherein the demodulation means may demodulate the other signal in the multiplexed signal based also on the information included in the first preamble signal.

Preferably, the signal processing apparatus of the invention may further include second information input means for inputting the information included in the first preamble signal from that another signal processing apparatus; wherein the demodulation means may demodulate the other signal in the multiplexed signal based also on the information included in the first preamble signal.

According to an even further embodiment of the present invention, there is provided a signal processing method including the steps of if information which is included in a first preamble signal detected from a multiplexed signal composed of a plurality of signals each holding the first preamble signal and having a different structure and which identifies each of the plurality of signals indicates a first signal, then causing a signal processing apparatus to input information about a duration of a second signal detected from the multiplexed signal based on information included in a second preamble signal detected following the first preamble signal, the information about the second signal duration being input from another signal processing apparatus configured to demodulate one of the first and the second signals in the multiplexed signal; and causing the signal processing apparatus to demodulate the other of the first and the second signals in the multiplexed signal based on the second signal duration information that has been input.

According to a still further embodiment of the present invention, there is provided a signal processing apparatus including a first signal processing block configured to extract one of a first and a second signal from a multiplexed signal composed of a plurality of signals each holding a first preamble signal and having a different structure; and a second signal processing block configured to extract the other of the first and the second signals from the multiplexed signal; wherein the first signal processing block includes first detection means for detecting the first preamble signal from the multiplexed signal, second detection means configured such that if information which is included in the first preamble signal detected by the first detection means and which identifies each of the plurality of signals indicates a first signal, then the second detection means detects a second preamble signal following the first preamble signal, duration detection means for detecting a duration of a second signal in the multiplexed signal based on information included in the second preamble signal detected by the second detection means, duration information output means for outputting information about the second signal duration detected by the duration detection means, to the second signal processing block, and demodulation means for demodulating the one of the first and the second signals in the multiplexed signal based on the information included in the first preamble signal, on the information included in the second preamble signal, and on the information about the second signal duration detected by the duration detection means, and the second signal processing block includes duration information input means for inputting the second signal duration information from the first signal processing block; and demodulation means for demodulating the other of the first and the second signals in the multiplexed signal based on the second signal duration information input through the duration information input means.

According to a yet further embodiment of the present invention, there is provided a signal processing method for use with a signal processing apparatus having a first and a second signal processing block, the signal processing method including the steps of causing the first signal processing block to detect a first preamble signal from a multiplexed signal composed of a plurality of signals each holding the first preamble signal and having a different structure; if information which is included in the first preamble signal and which identifies each of the plurality of signals indicates a first signal, then causing the first signal processing block to detect a second preamble signal following the first preamble signal; causing the first signal processing block to detect a duration of a second signal detected from the multiplexed signal based on information included in the detected second preamble signal; causing the first signal processing block to output information about the detected second signal duration to the second signal processing block; causing the first signal processing block to demodulate one of the first and the second signals in the multiplexed signal based on the information included in the first preamble signal, on the information included in the second preamble signal, and on the information about the second signal duration; causing the second signal processing block to input the information about the second signal duration from the first signal processing block; and causing the second signal processing block to demodulate the other of the first and the second signals in the multiplexed signal based on the input information about the second signal duration that has been input.

According to another embodiment of the present invention, there is provided a reception system including an acquisition block configured to acquire a signal via a transmission channel; and a transmission channel decode processing block configured to perform a transmission channel decoding process on the signal acquired via the transmission channel, the transmission channel decoding process including at least a demodulation process; wherein the signal acquired via the transmission channel is a multiplexed signal composed of a plurality of signals each holding a first preamble signal and having a different structure, and the transmission channel decode processing block includes first detection means for detecting the first preamble signal from the multiplexed signal, second detection means configured such that if information which is included in the first preamble signal detected by the first detection means and which identifies each of the plurality of signals indicates a first signal, then the second detection means detects a second preamble signal following the first preamble signal, duration detection means for detecting a duration of a second signal in the multiplexed signal based on information included in the second preamble signal detected by the second detection means, duration information output means for outputting information about the second signal duration detected by the duration detection means, to an apparatus configured to demodulate one of the first and the second signals in the multiplexed signal, and demodulation means for demodulating the other of the first and the second signals in the multiplexed signal based on the information included in the first preamble signal, on the information included in the second preamble signal, and on the information about the second signal duration detected by the duration detection means.

According to a further embodiment of the present invention, there is provided a reception system including a transmission channel decode processing block configured to perform a transmission channel decoding process on a signal acquired via a transmission channel, the transmission channel decoding process including at least a demodulation process; and an information source decode processing block configured to perform an information source decoding process on the signal having undergone the transmission channel decoding process, the information source decoding process including at least the process of expanding compressed information to restore original information; wherein the signal acquired via the transmission channel is a multiplexed signal composed of a plurality of signals each holding a first preamble signal and having a different structure, and the transmission channel decode processing block includes first detection means for detecting the first preamble signal from the multiplexed signal, second detection means configured such that if information which is included in the first preamble signal detected by the first detection means and which identifies each of the plurality of signals indicates a first signal, then the second detection means detects a second preamble signal following the first preamble signal, duration detection means for detecting a duration of a second signal in the multiplexed signal based on information included in the second preamble signal detected by the second detection means, duration information output means for outputting information about the second signal duration detected by the duration detection means, to an apparatus configured to demodulate one of the first and the second signals in the multiplexed signal, and demodulation means for demodulating the other of the first and the second signals in the multiplexed signal based on the information included in the first preamble signal, on the information included in the second preamble signal, and on the information about the second signal duration detected by the duration detection means.

According to an even further embodiment of the present invention, there is provided a reception system including a transmission channel decode processing block configured to perform a transmission channel decoding process on a signal acquired via a transmission channel, the transmission channel decoding process including at least a demodulation process; and an output block configured to output an image or a sound based on the signal having undergone the transmission channel decoding process; wherein the signal acquired via the transmission channel is a multiplexed signal composed of a plurality of signals each holding a first preamble signal and having a different structure, and the transmission channel decode processing block includes first detection means for detecting the first preamble signal from the multiplexed signal, second detection means configured such that if information which is included in the first preamble signal detected by the first detection means and which identifies each of the plurality of signals indicates a first signal, then the second detection means detects a second preamble signal following the first preamble signal, duration detection means for detecting a duration of a second signal in the multiplexed signal based on information included in the second preamble signal detected by the second detection means, duration information output means for outputting information about the second signal duration detected by the duration detection means, to an apparatus configured to demodulate one of the first and the second signals in the multiplexed signal, and demodulation means for demodulating the other of the first and the second signals in the multiplexed signal based on the information included in the first preamble signal, on the information included in the second preamble signal, and on the information about the second signal duration detected by the duration detection means.

According to a still further embodiment of the present invention, there is provided a reception system including a transmission channel decode processing block configured to perform a transmission channel decoding process on a signal acquired via a transmission channel, the transmission channel decoding process including at least a demodulation process; and a recording block configured to record the signal having undergone the transmission channel decoding process; wherein the signal acquired via the transmission channel is a multiplexed signal composed of a plurality of signals each holding a first preamble signal and having a different structure, and the transmission channel decode processing block includes first detection means for detecting the first preamble signal from the multiplexed signal, second detection means configured such that if information which is included in the first preamble signal detected by the first detection means and which identifies each of the plurality of signals indicates a first signal, then the second detection means detects a second preamble signal following the first preamble signal, duration detection means for detecting a duration of a second signal in the multiplexed signal based on information included in the second preamble signal detected by the second detection means, duration information output means for outputting information about the second signal duration detected by the duration detection means, to an apparatus configured to demodulate one of the first and the second signals in the multiplexed signal, and demodulation means for demodulating the other of the first and the second signals in the multiplexed signal based on the information included in the first preamble signal, on the information included in the second preamble signal, and on the information about the second signal duration detected by the duration detection means.

According to some of the embodiments of the invention outlined above, a first preamble signal is detected from a multiplexed signal composed of a plurality of signals each holding the first preamble signal and having a different structure. If information which is included in the detected first preamble signal and which identifies each of the plurality of signals indicates a first signal, then a second preamble signal is detected following the first preamble signal. A duration of a second signal in the multiplexed signal is detected based on information included in the detected second preamble signal. Information about the detected second signal duration is output to another signal processing apparatus configured to demodulate one of the first and the second signals in the multiplexed signal. The other of the first and the second signals in the multiplexed signal is then demodulated based on the information included in the first preamble signal, on the information included in the second preamble signal, and on the information about the second signal duration.

According to some other embodiments of the invention outlined above, if information which is included in a first preamble signal detected from a multiplexed signal composed of a plurality of signals each holding the first preamble signal and having a different structure and which identifies each of the plurality of signals indicates a first signal, then information is input about a duration of a second signal detected from the multiplexed signal based on information included in a second preamble signal detected following the first preamble signal, the information about the second signal duration being input from another signal processing apparatus configured to demodulate one of the first and the second signals in the multiplexed signal. The other of the first and the second signals in the multiplexed signal is then demodulated based on the second signal duration information that has been input.

According to still other embodiments of the invention outlined above, a first signal processing block is caused to detect a first preamble signal from a multiplexed signal composed of a plurality of signals each holding the first preamble signal and having a different structure. If information which is included in the first preamble signal and which identifies each of the plurality of signals indicates a first signal, then a second preamble signal is detected following the first preamble signal. The first signal processing block is caused to detect a duration of a second signal detected from the multiplexed signal based on information included in the detected second preamble signal. Information about the detected second signal duration is output to a second signal processing block. One of the first and the second signals in the multiplexed signal is demodulated based on the information included in the first preamble signal, on the information included in the second preamble signal, and on the information about the second signal duration. The second signal processing block is caused to input the information about the second signal duration from the first signal processing block. The other of the first and the second signals in the multiplexed signal is then demodulated based on the input information about the second signal duration that has been input.

According to yet other embodiments of the invention outlined above, a first preamble signal is detected from a multiplexed signal composed of a plurality of signals each holding a first preamble signal and having a different structure. If information which is included in the detected first preamble signal and which identifies each of the plurality of signals indicates a first signal, then a second preamble signal is detected following the first preamble signal. A duration of a second signal in the multiplexed signal is detected based on information included in the detected second preamble signal. Information about the detected second signal duration is output to an apparatus configured to demodulate one of the first and the second signals in the multiplexed signal. The other of the first and the second signals in the multiplexed signal is demodulated based on the information included in the first preamble signal, on the information included in the second preamble signal, and on the information about the second signal duration.

The signal processing apparatus of the embodiments of the present invention may be an independent apparatus or an internal block or blocks constituting part of a single apparatus.

The programs of the embodiments of the present invention may be offered either transmitted via transmission media or recorded on storage media.

The embodiments of the present invention, when suitably embodied as outlined above, can reduce the scale of circuitry, lower power dissipation, and efficiently demodulate multiplexed signals.

DETAILED DESCRIPTION OF THE PREFERRED EMBODIMENTS

What follows is a description of a first and a second embodiment of the signal processing apparatus to which the embodiments of the present invention are applied. The description will be given under the following headings:
1. First embodiment (configuration examples of the signal processing system)
2. Second embodiment (configuration examples of the reception system)

<1. First Embodiment>
[Configuration Example of the Signal Processing System]

Figure 2:
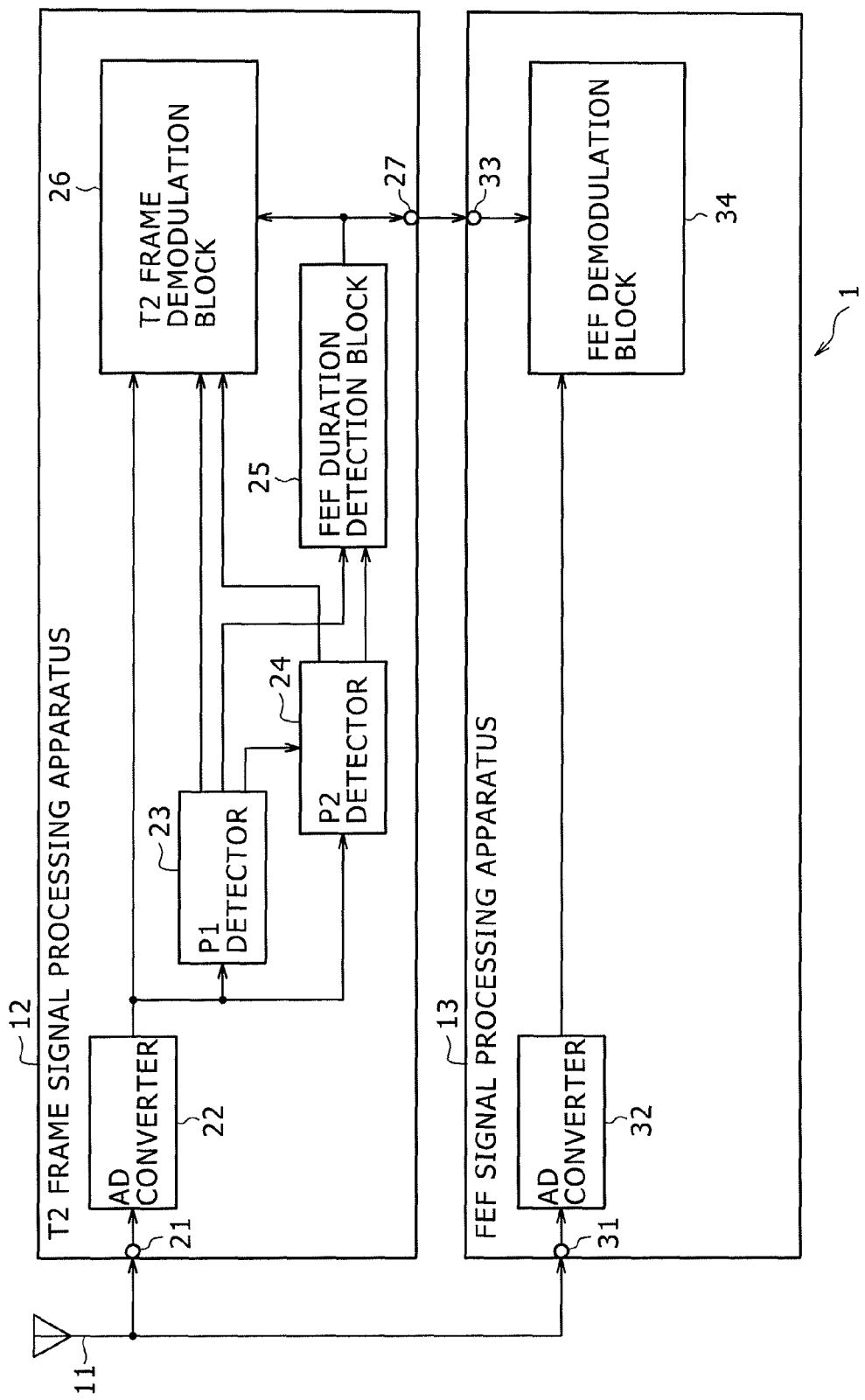
FIG. 2 is a block diagram showing a first configuration example of a signal processing system to which the embodiments of the present invention are applied.

FIG. 2 is a block diagram showing a first configuration example of the signal processing system to which the embodiments of the present invention are applied.

Figure 1:
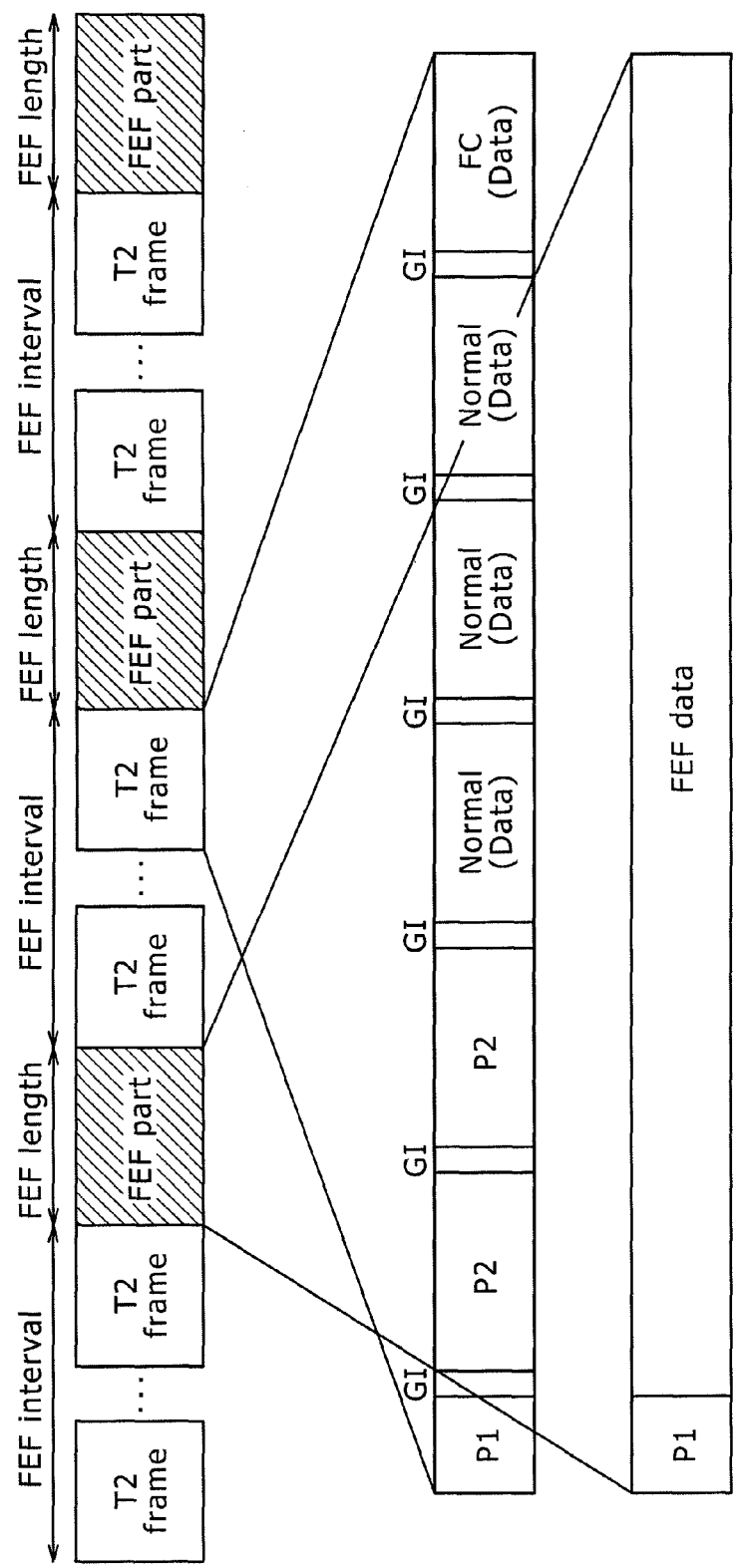
FIG. 1 is a schematic view showing a frame structure according to DVB-T2.

The signal processing system 1 of FIG. 2 receives a signal made up of T2 frames multiplexed with FEF (future extension frame) parts in accordance with DVB (Digital Video Broadcasting)-T2, as illustrated in FIG. 1. That is, the signal processing system 1 receives a multiplexed signal composed of a plurality of signals each having a different structure, such as T2 frames and FEF parts shown in FIG. 1, and extracts such T2 frames and FEF parts from the multiplexed signal.

The signal processing system 1 is constituted by an antenna 11, a T2 frame signal processing apparatus 12, and an FEF signal processing apparatus 13. The T2 frame signal processing apparatus 12 and FEF signal processing apparatus 13 may each be composed of an LSI for use in a TV set.

The antenna 11 receives a multiplexed signal having T2 frames and FEF parts multiplexed therein. The received multiplexed signal is forwarded from the antenna 11 to the T2 frame signal processing apparatus 12 and FEF signal processing apparatus 13.

The T2 frame signal processing apparatus 12 is made up of a signal input terminal 21, an A/D (analog-digital) converter 22, a P1 detector 23, a P2 detector 24, an FEF duration detection block 25, a T2 frame demodulation block 26, and an information output terminal 27.

The signal input terminal 21 inputs the multiplexed signal coming from the antenna 11 and forwards the signal to the A/D converter 22. The A/D converter 22 converts the received multiplexed signal from analog to digital form. The digital multiplexed signal is fed to the P1 detector 23, P2 detector 24, and T2 frame demodulation block 26.

The P1 detector 23 detects P1 included in the multiplexed signal coming from the A/D converter 22. Illustratively, by taking advantage of the fact that P1 contains its own copy, the P1 detector 23 observes correlation peaks and thereby detects the P1 location in the multiplexed signal.

As shown in FIG. 1, P1 is found in T2 frames as well as in FEF parts. That is, the T2 frame and FEF part are signals each holding P1 and having a different structure.

P1 contains identification information as signaling (error correcting coding) for determining whether the frame in question is a T2 frame or an FEF part. If the frame in question is a T2 frame, P1 includes more information (signaling) necessary for performing the process of demodulating, say, the FEF size (i.e., number of samples (symbols) subject to a single FFT computation) for FFT computations on symbols other than P1.

The P1 detector 23 acquires information contained in P1 and location information about P1 (called the P1 information collectively hereunder), and feeds the P1 information thus obtained to the P2 detector 24 and T2 frame demodulation block 26. The P1 detector 23 also sends the P1 information (P1 location information, to be more specific) to the FEF duration detection block 25.

If the identification information included in P1 indicates a T2 frame, then the P2 detector 24 detects P2 contained in the multiplexed signal coming from the A/D converter 22 on the basis of the information included in P1 and desired for the demodulation process. If the identification information included in P1 indicates an FEF part, then the P2 detector 24 stops its operation until the next T2 frame is detected.

P2 holds L1 pre-signaling (L1 PRE) and L1 post-signaling (L1 POST). The L1 pre-signaling includes information necessary for demodulating the L1 post-signaling. The L1 post-signaling includes information desired by the reception apparatus receiving this multiplexed signal for access to the physical layer (i.e., to its layer pipes).

The L1 pre-signaling includes such information as a pilot pattern (PP) indicating in which symbols (subcarriers) pilot signals are located as known signals, the presence or absence of an extension of the transmission bandwidth (BWT_EXT) for transmitting the OFDM signal, and the number of OFDM symbols included in one T2 frame (NDSYM). These pieces of information contained in the L1 pre-signaling are desired for demodulating the symbols of data (including FC).

The L1 pre-signaling further includes information specifying the FEF duration covering the FEF length and FEF interval (shown in FIG. 1), as well as FEF-related information indicating the FEF type (FEF_Type).

The P2 detector 24 acquires the above-mentioned pieces of information included in P2 (called the P2 information collectively hereunder), and sends the acquired P2 information to the T2 frame demodulation block 26. Out of the P2 information thus obtained, the P2 detector 24 selects the FEF length and FEF interval and sends them to the FEF duration detection block 25. Alternatively, the P2 detector 24 may supply all FEF-related information to the FEF duration detection block 25.

Based on the FEF length and FEF interval fed from the P2 detector 24, the FEF duration detection block 25 detects a duration of FEF parts (called the FEF duration hereunder) from the multiplexed signal. The FEF duration detection block 25 sends information about the detected FEF duration to the T2 frame demodulation block 26 and information output terminal 27.

Illustratively, the T2 frame demodulation block 26 is structured in such a manner as to include an FEF computation block, an equalization block, and an error correction block. By determining that the segment in the multiplexed signal from the A/D converter 22 other than the FEF duration indicated by the information from the FEF duration detection block 25 is formed by a T2 frame, the T2 frame demodulation block 26 demodulates the T2 frame using the information from the P1 detector 23 as well as the information from the P2 detector 24. That is, the T2 frame is demodulated by the T2 frame demodulation block 26 through FFT computation, equalization, and error correction, before being forwarded to downstream blocks such as a decoder, not shown.

The information output terminal 27 is connected to an information input terminal 33 of the FEF signal processing apparatus 13. The information about the FEF duration detected by the FEF duration detection block 25 is output through the information output terminal 27 to the FEF signal processing apparatus 13.

The FEF signal processing apparatus 13 is made up of a signal input terminal 31, an A/D converter 32, the information input terminal 33, and an FEF demodulation block 34.

The signal input terminal 31 inputs the multiplexed signal from the antenna 11 and forwards the signal to the A/D converter 32. The A/D converter 32 converts the received multiplexed signal from analog to digital form, and sends the digital multiplexed signal to the FEF demodulation signal 34. The information input terminal 33 inputs the information about the FEF duration from the T2 frame signal processing apparatus 12 and forwards the information to the FEF demodulation block 34.

By determining that that FEF duration in the multiplexed signal from the A/D converter 32 which is indicated by the information from the information input terminal 33 is formed by an FEF part, the FEF demodulation block 34 demodulates the FEF part. As with the T2 frame demodulation block 26, the FEF demodulation block 34 may be structured to include an FEF computation block, an equalization block, and an error correction block. The data demodulated by the FEF demodulation block 34 is output to downstream blocks, not shown.

In the example of FIG. 2, as described above, the T2 frame signal processing apparatus 12 supplies the FEF signal processing apparatus 13 with the FEF duration information necessary for demodulating FEF parts. For this reason, the FEF signal processing apparatus 13 is not desired to have a P1 detector, a P2 detector and an FEF duration detection block for detecting the FEF duration. Unless the FEF duration is detected, the FEF signal processing apparatus 13 may halt its circuit operations.

It follows that in the signal processing system 1 of FIG. 2, the circuit structure of the FEF signal processing apparatus 13 is significantly simplified. This helps reduce the scale of circuitry and thereby lower power dissipation of the apparatus.

[Typical Demodulation Process]

Figure 3:
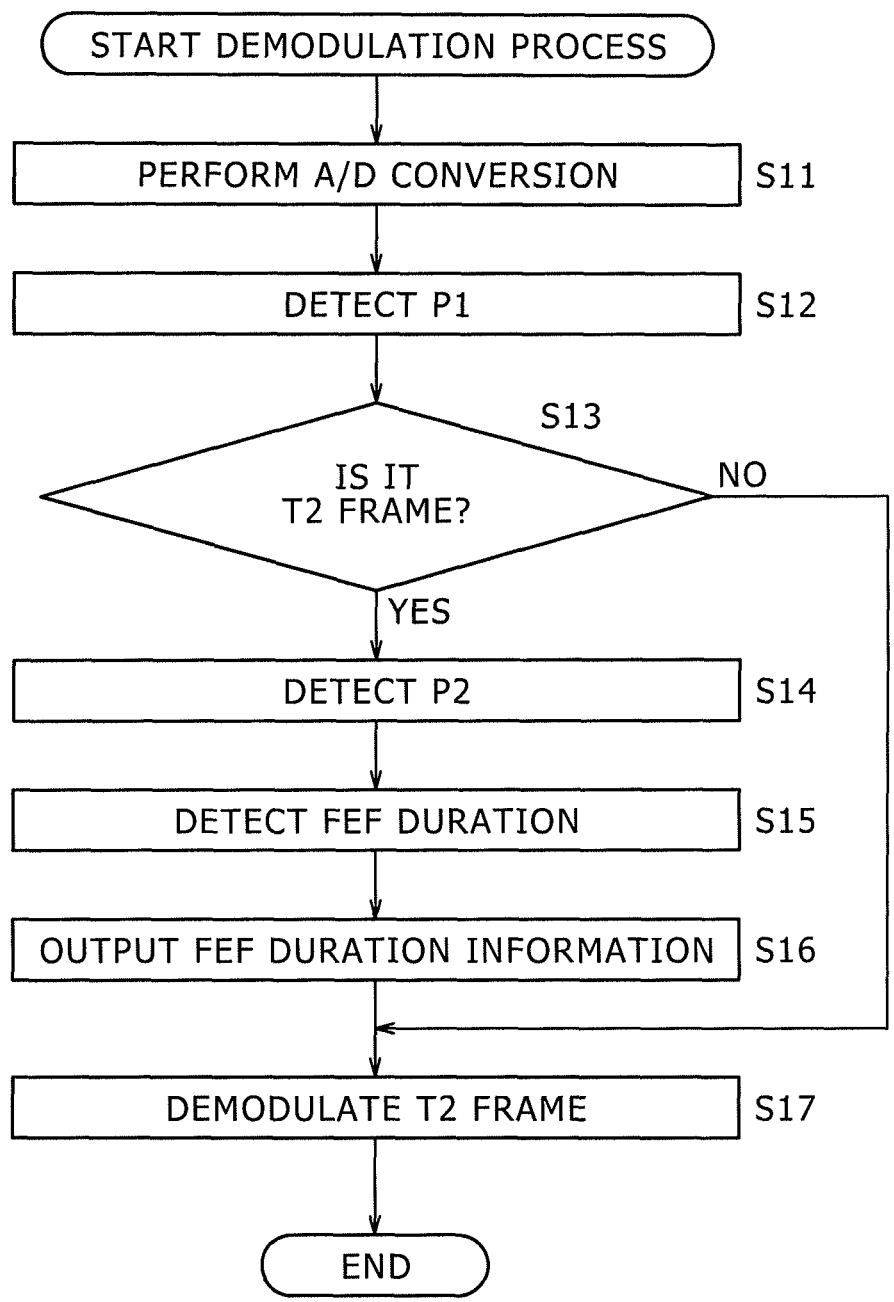
FIG. 3 is a flowchart explanatory of a modulation process performed by a T2 frame signal processing apparatus.

Described below in reference to the flowchart of FIG. 3 is the demodulation process performed by the T2 frame signal processing apparatus 12 in FIG. 2 for signal processing.

The signal input terminal 21 inputs a multiplexed signal from the antenna 11 and forwards the signal to the A/D converter 22. Upon receipt of the multiplexed signal from the antenna 11, the A/D converter 22 enters step S11 and converts the signal from analog to digital form. After the conversion, the A/D converter 22 feeds the digital multiplexed signal to the P1 detector 23, P2 detector 24, and T2 frame demodulation block 26.

On receiving the multiplexed signal from the A/D converter 22, the P1 detector 23 goes to step S12. In step S12, the P1 detector 23 detects P1 included in the multiplexed signal. The P1 detector 23 proceeds to acquire P1 information and feed the obtained P1 information to the P2 detector 24 and T2 frame demodulation block 26. Out of the P1 information, the P1 detector 23 selects the P1 location information and sends it to the FEF duration detection block 25.

In step S13, the P2 detector 24 checks to determine whether the multiplexed signal (i.e., its frame) currently supplied by the A/D converter 22 is a T2 frame on the basis of the identification information as part of the P1 information from the P1 detector 23. If in step S13 the frame of the multiplexed signal is found to be a T2 frame, then the P2 detector 24 goes to step S14. In step S14, the P2 detector 24 detects P2 included in the multiplexed signal from the A/D converter 22 based on the P1 information.

The P2 detector 24 acquires information included in P2 and sends the obtained information to the T2 frame demodulation block 26. Out of the acquired P2 information, the P2 detector 24 selects the FEF length and FEF interval and sends them to the FEF duration detection block 25.

In step S15, the FEF duration detection block 25 detects an FEF duration in the multiplexed signal based on the P1 location information from the P1 detector 23 and on the FEF length and FEF interval from the P2 detector 24. The FEF duration detection block 25 sends information about the detected FEF duration to the T2 frame demodulation block 26 and information output terminal 27.

In step S16, the information output terminal 27 outputs to the FEF signal processing apparatus 13 the information about the FEF duration detected by the FEF duration detection block 25.

If in step S13 the frame of the multiplexed signal is not found to be a T2 frame, then the P2 detector 24 stops its operation and does not forward the information included in P2 to the FEF duration detection block 25. That means the information about the FEF duration will not be detected. That is, if in step S13 the frame of interest is not found to be a T2 frame, then steps S14 through S16 are skipped, and control is passed on to step S17.

In step S17, the T2 frame demodulation block 26 demodulates the T2 frame based on the FEF duration indicated by the information coming from the FEF duration detection block 25. That is, by determining that the segment in the multiplexed signal from the A/D converter 22 other than the FEF duration denoted by the information from the FEF duration detection block 25 is a T2 frame, the T2 frame demodulation block 26 demodulates the T2 frame through the use of the information from the P1 detector 23 as well as the information from the P2 detector 24.

Because the T2 frames are demodulated on the basis of the detected FEF duration as described above, the T2 frame demodulation block 26 can exclude the influence of the FEF duration on the demodulation of T2 frames. This makes it possible to enhance the performance of T2 frame demodulation.

Figure 4:
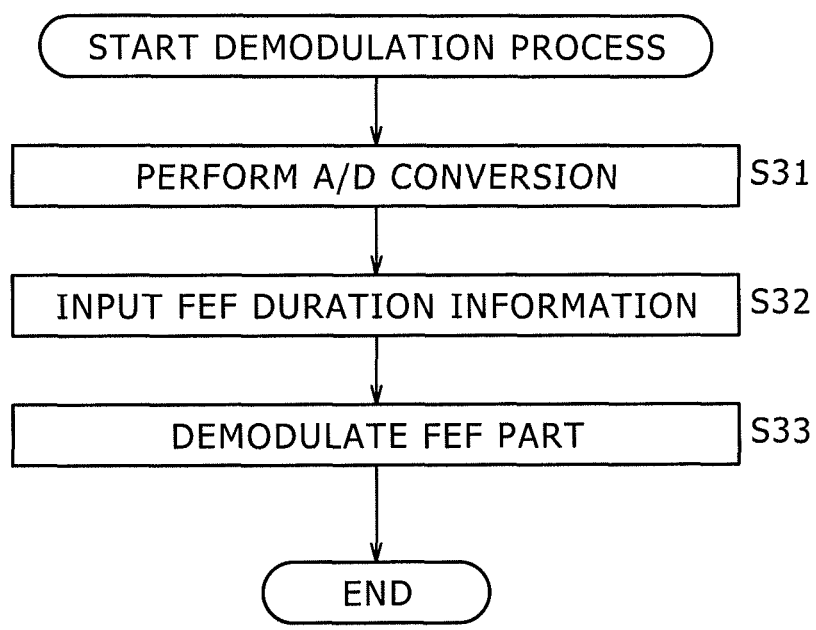
FIG. 4 is a flowchart explanatory of a modulation process performed by an FEF signal processing apparatus.

Described below in reference to the flowchart of FIG. 4 is the demodulation process performed by the FEF signal processing apparatus 13 in FIG. 2 for signal processing.

The signal input terminal 31 inputs a multiplexed signal from the antenna 11 and forwards the signal to the A/D converter 32. On receiving the multiplexed signal from the antenna 11, the A/D converter 32 enters step S31 and converts the signal from analog to digital form. After the conversion, the A/D converter 32 sends the digital multiplexed signal to the FEF demodulation block 34.

Meanwhile, with P1 and P2 detected by the T2 frame signal processing apparatus 12, the information output terminal 27 of the apparatus 12 outputs information about the FEF duration detected by the FEF duration detection block 25 to the FEF signal processing apparatus 13 (in step S16 of FIG. 3).

Correspondingly, the information input terminal 33 in step S32 inputs the FEF duration information from the T2 frame signal processing apparatus 12 and forwards the information to the FEF demodulation block 34. If no FEF duration is detected by the T2 frame signal processing apparatus 12, then step S32 is skipped.

In step S33, the FEF demodulation block 34 demodulates the FEF part based on the FEF duration information. Specifically, by determining that that FEF duration in the multiplexed signal from the A/D converter 22 which is indicated by the information from the information input terminal 33 is formed by an FEF part, the FEF demodulation block 34 demodulates the FEF part.

As described above, the FEF parts in the multiplexed signal are demodulated on the basis of the FEF duration information from the T2 frame signal processing apparatus 12. This enables the FEF demodulation block 34 to exclude the influence of T2 frames on the demodulation of FEF parts. That in turn makes it possible to enhance the performance of FEF part demodulation.

Furthermore, since there is no need for the FEF signal processing apparatus 13 to detect an FEF duration, the apparatus 13 can halt its circuit operations except during the FEF duration.

[Another Configuration Example of the Signal Processing System]

Figure 5:
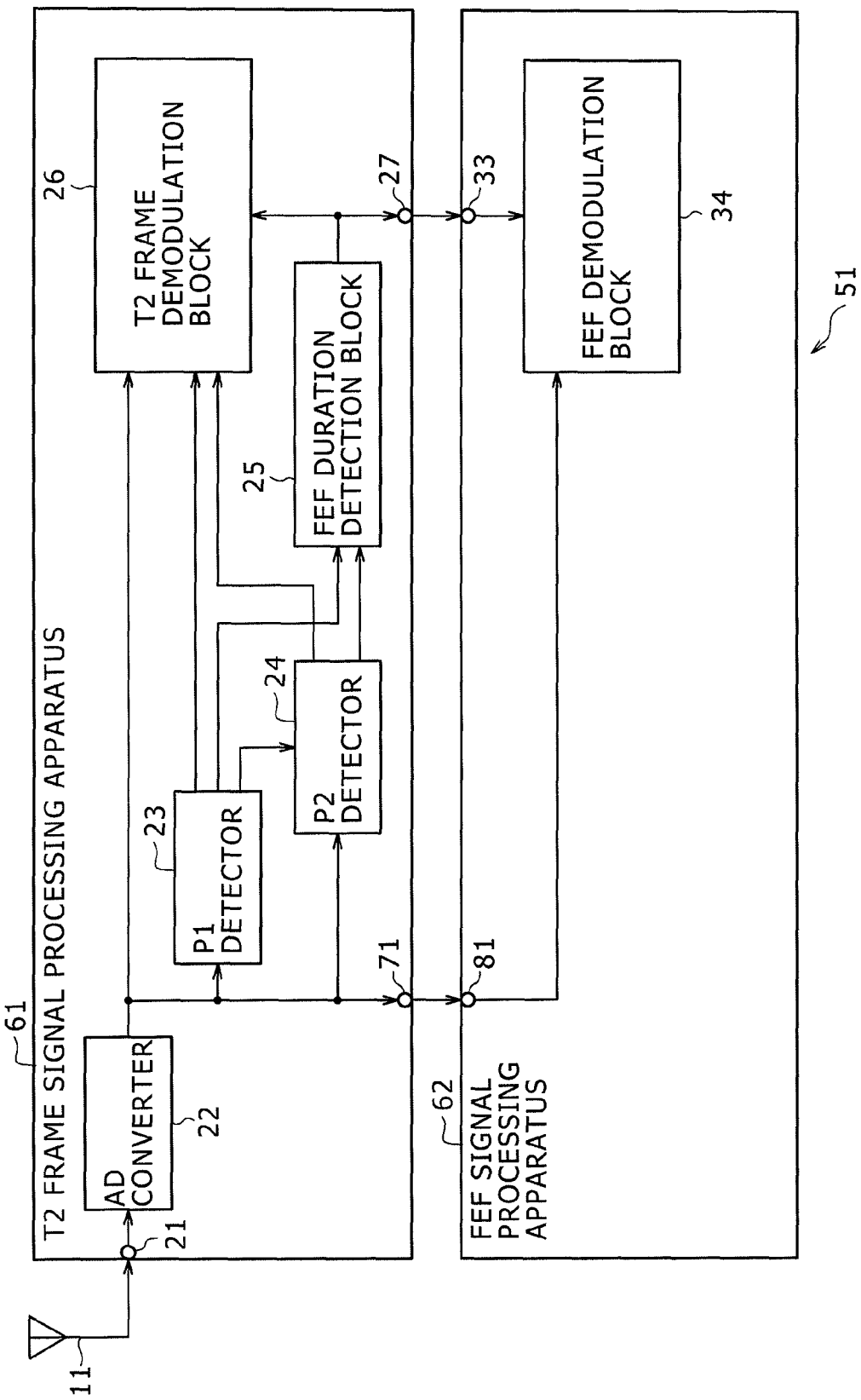
FIG. 5 is a block diagram showing a second configuration example of the signal processing system to which the embodiments of the present invention are applied.

FIG. 5 is a block diagram showing a second configuration example of the signal processing system to which the embodiments of the present invention are applied. Of the reference numerals in FIG. 5, those already used in FIG. 2 designate like or corresponding parts, and the descriptions of these parts will be omitted hereunder where redundant.

The signal processing system 51 in FIG. 5 is made up of an antenna 11, a T2 frame signal processing apparatus 61, and an FEF signal processing apparatus 62.

The T2 frame signal processing apparatus 61 is common to the T2 frame signal processing apparatus 12 in FIG. 2 in that it includes the signal input terminal 21, A/D converter 22, P1 detector 23, P2 detector 24, FEF duration detection block 25, T2 frame demodulation block 26, and information output terminal 27. The T2 frame signal processing apparatus 61 is different from its counterpart 12 in FIG. 2 in that it additionally contains a signal output terminal 71.

The FEF signal processing apparatus 62 is common to the FEF signal processing apparatus 13 in FIG. 2 in that it includes the information input terminal 33 and FEF demodulation block 34. The FEF signal processing apparatus 62 is different from its counterpart 13 in FIG. 2 in that it excludes the signal input terminal 31 and A/D converter 32 while additionally containing a signal input terminal 81.

In the T2 frame signal processing apparatus 61 of FIG. 5, the multiplexed signal in digital form from the A/D converter 22 is sent to the P1 detector 23, P2 detector 24, and T2 frame demodulation block 26 as well as to the signal output terminal 71.

The signal output terminal 71 outputs the digital multiplexed signal coming from the A/D converter 22 to the FEF signal processing apparatus 62. The digital multiplexed signal output from the signal output terminal 71 is input to the signal input terminal 81 of the FEF signal processing apparatus 62. The signal input terminal 81 forwards the digital multiplexed signal that has been input to the FEF demodulation block 34.

By determining that that FEF duration in the multiplexed signal from the signal input terminal 81 which is indicated by the information from the information input terminal 33 is formed by an FEF part, the FEF demodulation block 34 demodulates the FEF part.

As with the signal processing system 1 of FIG. 1, there is no need for the signal processing system 51 in FIG. 5 to incorporate a P1 detector, a P2 detector, and an FEF duration detection block. Furthermore, the signal processing system 51 in FIG. 5 has no need for an A/D converter.

It follows that in the signal processing system 51 of FIG. 5, the circuits constituting the FEF signal processing apparatus 62 can be further simplified. The signal processing system 51 is thus allowed to further reduce the scale of its circuitry and lower power dissipation.

[Another Typical Demodulation Process]

Figure 6:
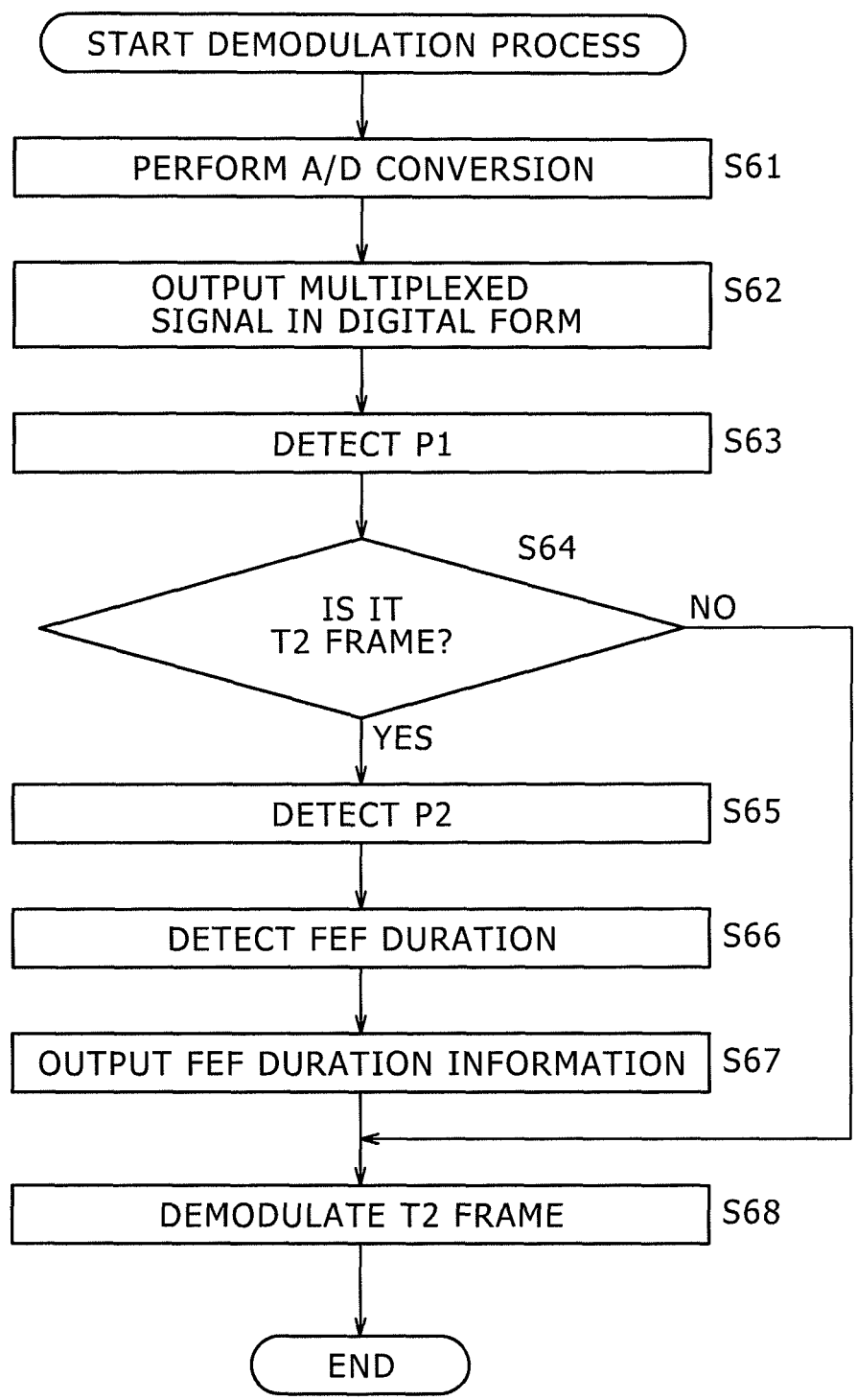
FIG. 6 is a flowchart explanatory of another modulation process performed by the T2 frame signal processing apparatus.

Described below in reference to the flowchart of FIG. 6 is the demodulation process performed by the T2 frame signal processing apparatus 61 in FIG. 5 for signal processing.

The signal input terminal 21 inputs a multiplexed signal from the antenna 11 and forwards the signal to the A/D converter 22. Upon receipt of the multiplexed signal from the antenna 11, the A/D converter 22 enters step S61 and converts the signal from analog to digital form. After the conversion, the A/D converter 22 feeds the digital multiplexed signal to the P1 detector 23, P2 detector 24, T2 frame demodulation block 26, and signal output terminal 71.

In step S62, the signal output terminal 71 outputs the digital multiplexed signal coming from the A/D converter 22 to the FEF signal processing apparatus 62.

The subsequent steps (i.e., steps S63 through S68) are basically the same as steps S12 through S17 in FIG. 3 and thus will not be discussed further.

In the demodulation process of FIG. 6, as described above, T2 frames are also demodulated on the basis of the detected FEF duration. This enables the T2 frame demodulation block 26 to exclude the influence of the FEF duration on the demodulation of T2 frames. That in turn makes it possible to enhance the performance of T2 frame demodulation.

Figure 7:
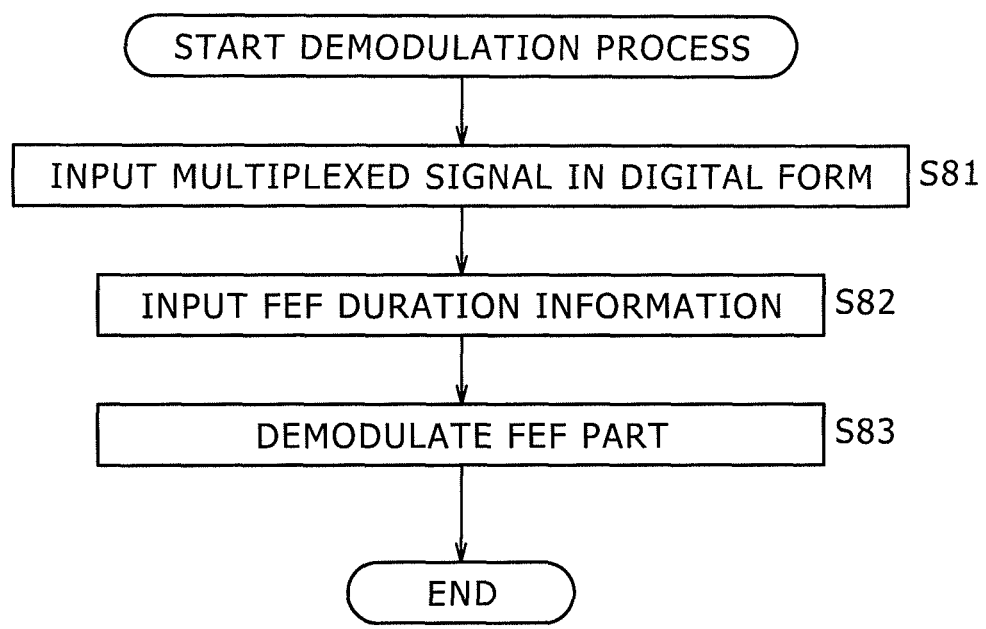
FIG. 7 is a flowchart explanatory of another modulation process performed by the FEF signal processing apparatus.

Described below in reference to the flowchart of FIG. 7 is the processing process performed by the FEF signal processing apparatus 62 in FIG. 5 for signal processing.

The signal output terminal 71 of the T2 frame signal processing apparatus 61 outputs to the FEF signal processing apparatus 62 (in step S62 of FIG. 6) the multiplexed signal converted by the A/D converter 22 from analog to digital form following input through the antenna 11.

Correspondingly, the signal input terminal 81 in step S81 inputs the digital multiplexed signal and feeds it to the FEF demodulation block 34.

The subsequent steps (i.e., steps S82 and S83) are basically the same as steps S32 and S33 in FIG. 4 and thus will not be discussed further.

In the demodulation process of FIG. 7, as described above, the FEF parts are demodulated on the basis of the FEF duration coming from the T2 frame signal processing apparatus 61. This enables the FEF demodulation block 34 to exclude the influence of T2 frames on the demodulation of FEF parts. That in turn makes it possible to enhance the performance of FEF part demodulation.

[Another Configuration Example of the Signal Processing System]

Figure 8:
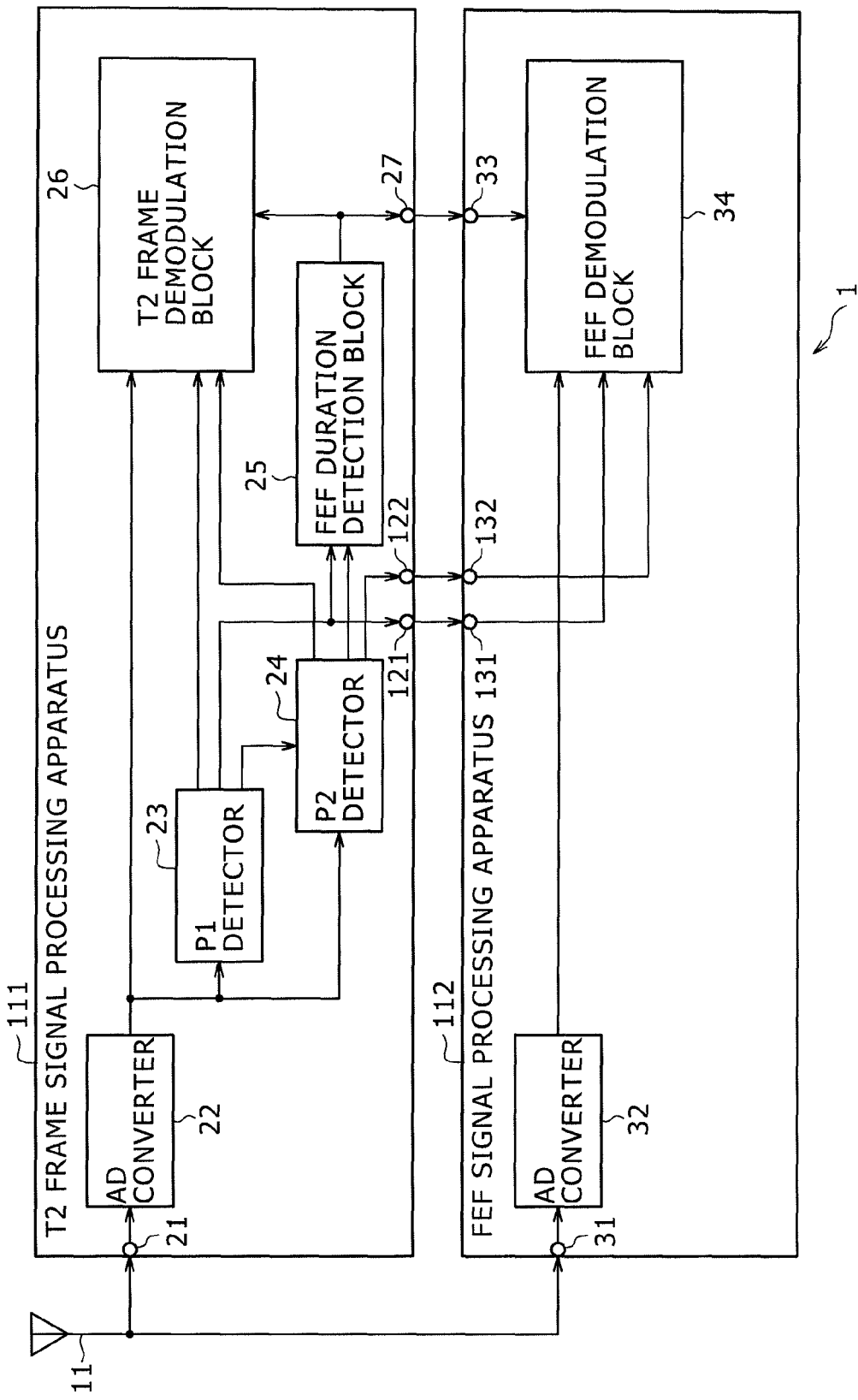
FIG. 8 is a block diagram of a third configuration example of the signal processing system to which the embodiments of the present invention are applied.

FIG. 8 is a block diagram showing a third configuration example of the signal processing system to which the embodiments of the present invention are applied. Of the reference numerals in FIG. 8, those already used in FIG. 2 designate like or corresponding parts, and the descriptions of these parts will be omitted hereunder where redundant.

The signal processing system 101 in FIG. 8 is made up of an antenna 11, a T2 frame signal processing apparatus 111, and an FEF signal processing apparatus 112.

The T2 frame signal processing apparatus 111 is common to the T2 frame signal processing apparatus 12 in FIG. 2 in that it includes the signal input terminal 21, A/D converter 22, P1 detector 23, P2 detector 24, FEF duration detection block 25, T2 frame demodulation block 26, and information output terminal 27. The T2 frame signal processing apparatus 111 is different from its counterpart 12 in FIG. 2 in that it additionally contains information output terminals 121 and 122.

The FEF signal processing apparatus 112 is common to the FEF signal processing apparatus 13 in FIG. 2 in that it includes the signal input terminal 31, A/D converter 32, information input terminal 33, and FEF demodulation block 34. The FEF signal processing apparatus 112 is different from its counterpart 13 in FIG. 2 in that it additionally contains information input terminals 131 and 132.

In the T2 frame signal processing apparatus 111 of FIG. 8, P1 location information coming from the P1 detector 23 is supplied not only to the FEF duration detection block 25 but also to the information output terminal 121. Of the P2 information coming from the P2 detector 24, FEF-related information is fed to the information output terminal 122.

The information output terminal 121 outputs the P1 location information coming from the P1 detector 23 to the information input terminal 131 of the FEF signal processing apparatus 112. The information output terminal 122 outputs the FEF-related information coming from the P2 detector 24 to the information input terminal 132 of the FEF signal processing apparatus 112.

The information input terminal 131 inputs the P1 location information from the information output terminal 121 and forwards the information to the FEF demodulation block 34. The information input terminal 132 inputs the FEF-related information coming from the information output terminal 122 and feeds the information to the FEF demodulation block 34.

By determining that that FEF duration in the multiplexed signal from the A/D converter 32 which is indicated by the information from the information input terminal 33 is formed by an FEF part, the FEF demodulation block 34 demodulates the FEF part. For FEF part demodulation, the FEF demodulation block 34 utilizes the P1 location information from the information input terminal 131 and the FEF-related information from the information input terminal 132 as desired.

As described above, the signal processing system 101 in FIG. 8 has no need for a P1 detector, a P2 detector, and an FEF duration detection block as with the signal processing system 1 in FIG. 2. Furthermore, the FEF demodulation block 34 is supplied with the P1 location information and FEF-related information in addition to the FEF duration information. This enables the signal processing system 101 to perform FEF part demodulation more reliably than before.

[Another Typical Demodulation Process]

Figure 9:
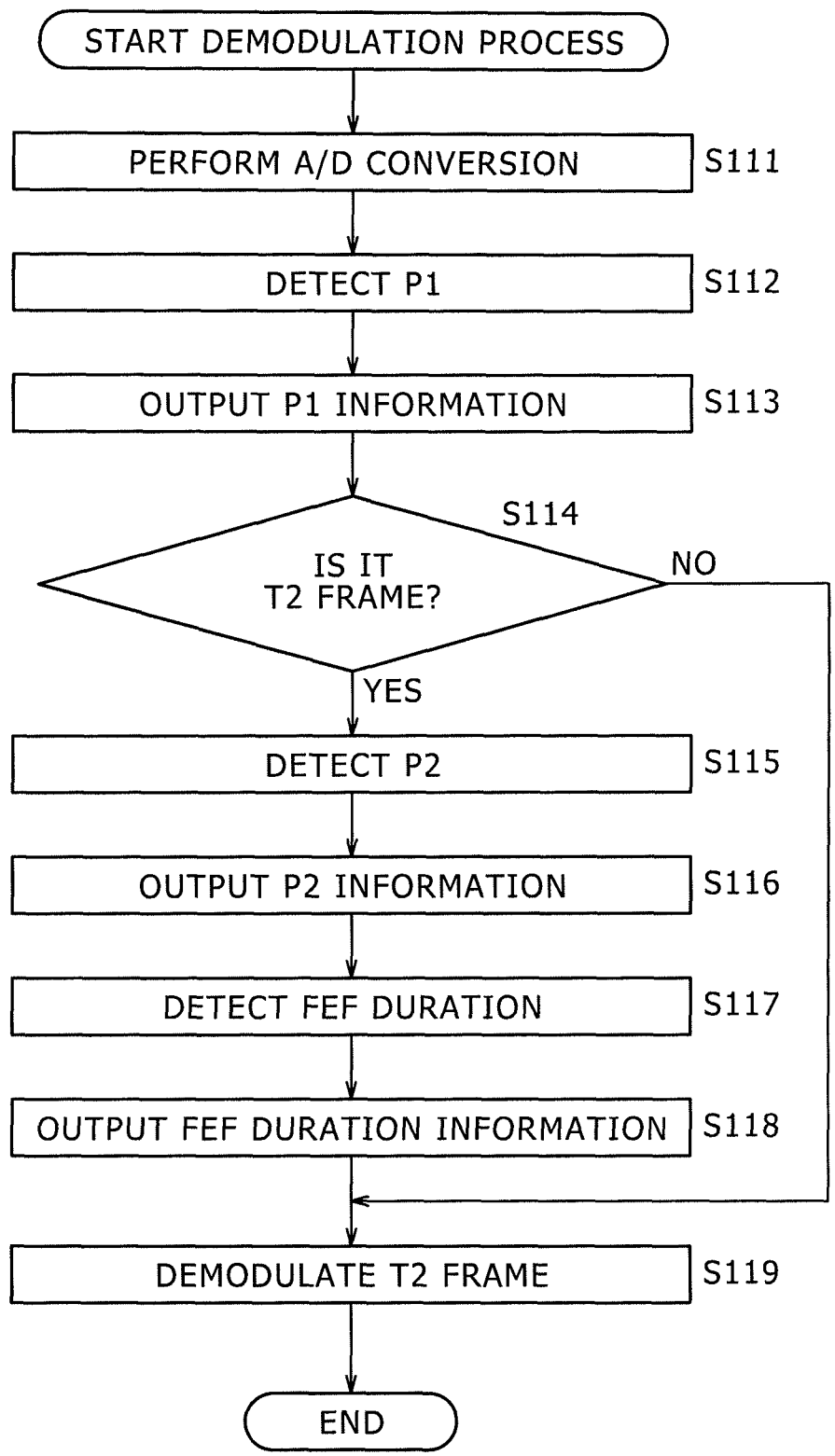
FIG. 9 is a flowchart explanatory of another modulation process performed by the T2 frame signal processing apparatus.

Described below in reference to the flowchart of FIG. 9 is the demodulation process performed by the T2 frame signal processing apparatus 111 in FIG. 8 for signal processing.

The signal input terminal 21 inputs a multiplexed signal from the antenna 11 and forwards the signal to the A/D converter 22. Upon receipt of the multiplexed signal from the antenna 11, the A/D converter 22 enters step S111 and converts the signal from analog to digital form. After the conversion, the A/D converter 22 feeds the digital multiplexed signal to the P1 detector 23, P2 detector 24, and T2 frame demodulation block 26.

On receiving the multiplexed signal from the A/D converter 22, the P1 detector 23 goes to step S112. In step S112, the P1 detector 23 detects P1 included in the multiplexed signal. The P1 detector 23 proceeds to acquire P1 information and feed the acquired P1 information to the P2 detector 24 and T2 frame demodulation block 26. Out of the P1 information, the P1 detector 23 selects P1 location information and sends it to the FEF duration detection block 25 and information output terminal 121.

In step S113, the information output terminal 121 outputs the P1 information (P1 location information in the case of the T2 frame signal processing apparatus 111) coming from the P1 detector 23 to the information input terminal 131 of the FEF signal processing apparatus 112.

In step S114, the P2 detector 24 checks to determine whether the multiplexed signal currently supplied by the A/D converter 22 is a T2 frame on the basis of the identification information as part of the P1 information from the P1 detector 23. If in step S114 the multiplexed signal is found to be a T2 frame, then the P2 detector 24 goes to step S115. In step S115, the P2 detector 24 detects P2 included in the multiplexed signal from the A/D converter 22 based on the P1 information.

The P2 detector 24 obtains information included in P2 and sends the obtained information to the P2 frame demodulation block 26. Out of the P2 information thus acquired, the P2 detector 24 selects the FEF length and FEF interval and sends them to the FEF duration detection block 25. The P2 detector 24 further acquires information included in P2 and feeds the acquired information to the T2 frame demodulation block 26. Out of the obtained P2 information, the P2 detector 24 also selects FEF-related information and sends it to the information output terminal 132.

In step S116, the information output terminal 122 outputs the P2 information (FEF-related information in the case of the T2 frame signal processing apparatus 111) coming from the P2 detector 24 to the information input terminal 132 of the FEF signal processing apparatus 112.

In step S117, the FEF duration detection section 25 detects an FEF duration in the multiplexed signal based on the FEF length and FEF interval out of the information fed from the P2 detector 24. The FEF duration detection block 25 proceeds to supply information about the detected FEF duration to the T2 frame demodulation block 26 and information output terminal 27.

In step S118, the information output terminal 27 outputs to the FEF signal processing apparatus 13 the information about the FEF duration detected by the FEF duration detection block 25.

If in step S114 the multiplexed signal is not found to be a T2 frame, then the P2 detector 24 stops its operation and does not feed the information included in P2 to the FEF duration detection block 25. Consequently, the information about the FEF duration is not detected either. That is, if in step S114 the multiplexed signal is not determined to be a T2 frame, then steps S115 through S118 are skipped and control is passed on to step S119.

In step S119, the T2 frame demodulation block 26 demodulates the T2 frame. Specifically, by determining that the segment in the multiplexed signal from the A/D converter 22 other than the FEF duration indicated by the information from the FEF duration detection block 25 is formed by a T2 frame, the T2 frame demodulation block 26 demodulates the T2 frame using the information from the P1 detector 23 as well as the information from the P2 detector 24.

In the demodulation process of FIG. 9, the T2 frames are demodulated also on the basis of the detected FEF duration as described above. This enables the T2 frame demodulation block 26 to exclude the influence of the FEF duration on the demodulation of T2 frames. That in turn makes it possible to enhance the performance of T2 frame demodulation.

Figure 10:
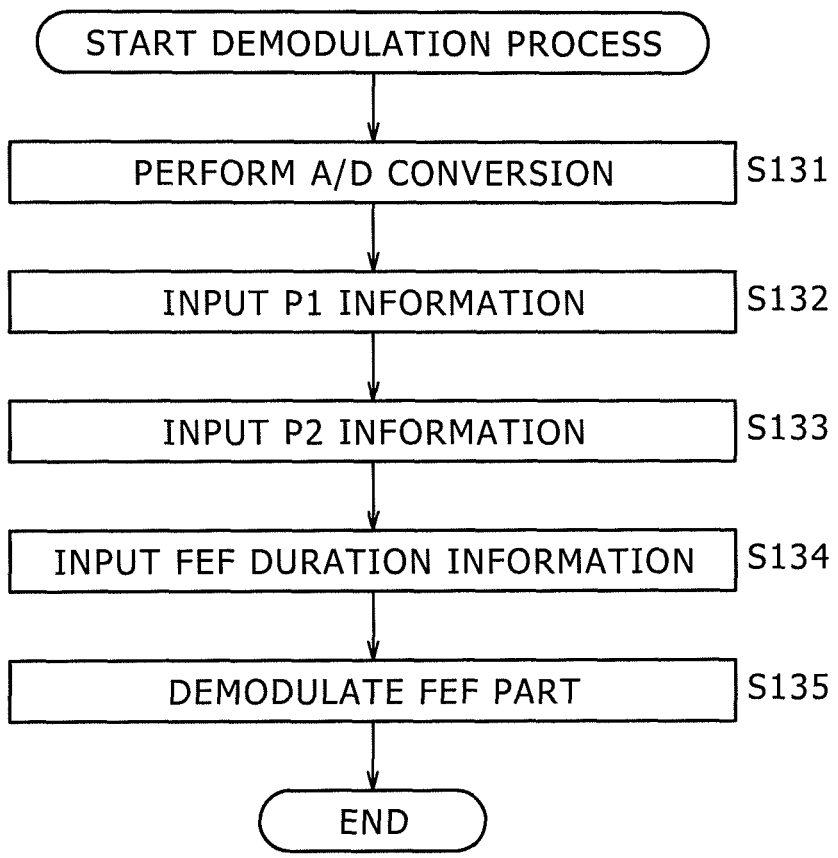
FIG. 10 is a flowchart explanatory of another modulation process performed by the FEF signal processing apparatus.

Described below in reference to the flowchart of FIG. 10 is the demodulation process performed by the FEF signal processing apparatus 112 in FIG. 8 for signal processing.

The signal input terminal 31 inputs a multiplexed signal from the antenna 11 and forwards the signal to the A/D converter 32. Upon receipt of the multiplexed signal from the antenna 11, the A/D converter 32 enters step S131 and converts the signal from analog to digital form. After the conversion, the A/D converter 32 feeds the digital multiplexed signal to the T2 frame demodulation block 26.

At this point, the information output terminal 121 of the T2 frame signal processing apparatus 111 outputs the detected P1 signal (P1 location information, to be more specific) to the FEF signal processing apparatus 112 (in step S113 of FIG. 9). Correspondingly, the information input terminal 131 in step S132 inputs the P1 information (P1 location information in the case of the FEF signal processing apparatus 112) from the T2 frame signal processing apparatus 111 and forwards the information to the FEF demodulation block 34.

Also, the information output terminal 122 of the T2 frame signal processing apparatus 111 outputs the detected P2 information (FEF-related information, to be more specific) to the FEF signal processing apparatus 112 (in step S116 of FIG. 9). Correspondingly, the information input terminal 132 in step S133 inputs the P2 information (FEF-related information in the case of the FEF signal processing apparatus 112) from the T2 frame signal processing apparatus 111 and sends the information to the FEF demodulation block 34.

Further, the information output terminal 27 of the T2 frame signal processing apparatus 111 outputs to the FEF signal processing apparatus 112 (in step S118 of FIG. 9) the information about the FEF duration detected by the FEF duration detection block 25 of the T2 frame signal processing apparatus 111. Correspondingly, the information input terminal 33 in step S32 inputs the FEF duration information from the T2 frame signal processing apparatus 111 and forwards the information to the FEF demodulation block 34.

If the T2 frame signal processing apparatus 111 determines that the current frame is not an FEF part based on the P1 information, then steps S133 and S134 are skipped.

In step S135, by determining that that FEF duration in the multiplexed signal from the A/D converter 32 which is indicated by the information from the information input terminal 33 is formed by an FEF part, the FEF demodulation block 34 demodulates the FEF part. For FEF part demodulation, the FEF demodulation block 34 utilizes the P1 location information coming from the information input terminal 131 and the FEF-related information from the information input terminal 132 as desired.

As described above, the FEF parts are demodulated on the basis of not only the FEF duration from the T2 frame signal processing apparatus 111 but also the P1 location information from the information input terminal 131 as well as the FEF-related information from the information input terminal 132. This enables the FEF demodulation block 34 to exclude the influence of T2 frames on the demodulation of FEF parts. That in turn makes it possible to enhance the performance of FEF part demodulation.

[Another Configuration Example of the Signal Processing System]

Figure 11:
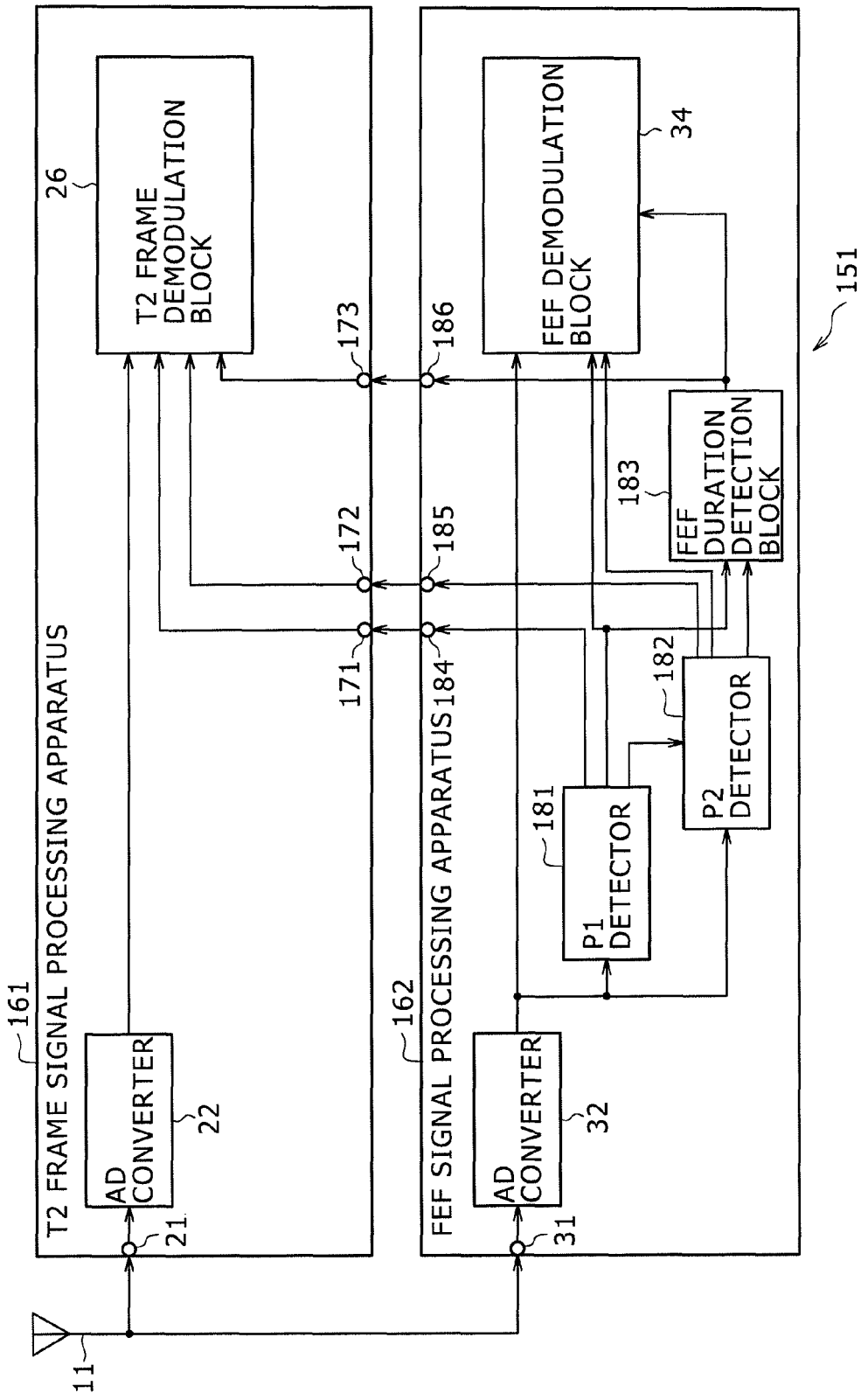
FIG. 11 is a block diagram showing a fourth configuration example of the signal processing system to which the embodiments of the present invention are applied.

FIG. 11 is a block diagram showing a fourth configuration example of the signal processing system to which the embodiments of the present invention are applied. Of the reference numerals in FIG. 11, those already used in FIG. 2 designate like or corresponding parts, and the descriptions of these parts will be omitted hereunder where redundant.

The signal processing system 151 in FIG. 11 is made up of an antenna 11, a T2 frame signal processing apparatus 161, and an FEF signal processing apparatus 162.

The T2 frame signal processing apparatus 161 is common to the T2 frame signal processing apparatus 12 in FIG. 2 in that it includes the signal input terminal 21, A/D converter 22, and T2 frame demodulation block 26. The T2 frame signal processing apparatus 161 is different from its counterpart 12 in FIG. 2 in that it excludes the P1 detector 23, P2 detector 24, FEF duration detection block 25, and information output terminal 27 while additionally containing information input terminals 171 through 173.

The FEF signal processing apparatus 162 is common to the FEF signal processing apparatus 13 in FIG. 2 in that it includes the signal input terminal 31, A/D converter 32, and FEF demodulation block 34. The FEF signal processing apparatus 162 is different from its counterpart 13 in FIG. 2 in that it additionally contains a P1 detector 181, a P2 detector 182, an FEF duration detection block 183, and information output terminals 184 through 186.

In the T2 frame signal processing apparatus 161, the A/D converter 22 converts the received multiplexed signal from analog to digital form and sends the digital multiplexed signal to the T2 frame demodulation block 26.

By determining that the segment in the multiplexed signal from the A/D converter 22 other than the FEF duration indicated by the information from the information input terminal 173 is formed by a T2 frame, the T2 frame demodulation block 26 demodulates the T2 frame using the information coming from the information input terminals 171 and 172.

The information input terminal 171 inputs the P1 information from the information output terminal 184 of the FEF signal processing apparatus 162 and feeds the information to the T2 frame demodulation block 26. The information input terminal 172 inputs the P2 information from the information output terminal 185 of the FEF signal processing apparatus 162 and forwards the information to the T2 frame demodulation block 26. The information input terminal 173 inputs the information about the FEF duration from the information output terminal 186 of the FEF signal processing apparatus 162 and supplies the information to the T2 frame demodulation block 26.

In the FEF signal processing apparatus 162, meanwhile, the A/D converter 32 converts the multiplexed signal in analog form from the signal input terminal 31 into a multiplexed signal in digital form, and sends the digital multiplexed signal to the P1 detector 181, P2 detector 182, and FEF demodulation block 34.

As with the P1 detector 23 in FIG. 2, the P1 detector 181 detects P1 included in the multiplexed signal from the A/D converter 32. The P1 detector 181 acquires information formed by the information included in P1 and by information about the P1 location, and sends the acquired P1 information to the P2 detector 182 and information output terminal 184. Also, the P1 detector 181 feeds the P1 location information to the FEF duration detection block 183 and FEF demodulation block 34.

When the identification information included in P1 identifies a T2 frame, the P2 detector 182, like the P2 detector 24 in FIG. 2, detects P2 included in the multiplexed signal from the A/D converter 32 based on the information which is included in P1 and which is necessary for the demodulation process.

The P2 detector 182 acquires P2 information and sends the acquired P2 information to the information output terminal 185. Out of the P2 information thus obtained, the P2 detector 182 selects the FEF length and FEF interval and feeds them to the FEF duration detection block 183. From the acquired P2 information, the P2 detector 182 selects FEF-related information and supplies the information to the FEF demodulation block 34. When the identification information included in P1 identifies an FEF part, the P2 detector 182, as with the P2 detector 24 in FIG. 2, stops its operation until the next T2 frame is detected.

Like the FEF duration detection block 25 in FIG. 2, the FEF duration detection block 183 detects an FEF duration in the multiplexed signal based on the FEF length and FEF interval supplied from the P2 detector 24. The FEF duration detection block 183 outputs information about the detected FEF duration to the FEF demodulation block 34 and information output terminal 186.

By determining that that FEF duration in the multiplexed signal from the A/D converter 32 which is indicated by the information from the FEF duration detection block 183 is formed by an FEF part, the FEF demodulation block 34 demodulates the FEF part. For FEF part demodulation, the FEF demodulation block 34 utilizes the P1 location information coming from the P1 detector 181 and the FEF-related information from the P2 detector 182 as desired.

The information output terminal 184 outputs the P1 information coming from the P1 detector 181 to the information input terminal 171 of the T2 frame signal processing apparatus 161. The information output terminal 185 outputs the P2 information fed from the P2 detector 182 to the information input terminal 172 of the T2 frame signal processing apparatus 161. The information output terminal 186 outputs the FEF duration information supplied from the FEF duration detection block 183 to the information input terminal 173 of the T2 frame signal processing apparatus 161.

As described above, the P1 detector 181, P2 detector 182, and FEF duration detection block 183 in the FEF signal processing apparatus 162 of FIG. 11 correspond respectively to the P1 detector 23, P2 detector 24, and FEF duration detection block 25 in the T2 frame signal processing apparatus 12 of FIG. 2.

That is, the FEF signal processing apparatus 162 in the signal processing system 151 of FIG. 11 is equivalent to the T2 frame signal processing apparatus 111 in the signal processing system 101 of FIG. 8 except for the T2 frame demodulation block 26 of the apparatus 111 being replaced by the FEF demodulation block 34. The T2 frame signal processing apparatus 161 in the signal processing system 151 of FIG. 11 is equivalent to the FEF signal processing apparatus 161 in the signal processing system 101 of FIG. 8 except for the FEF demodulation block 34 of the apparatus 161 being replaced by the T2 frame demodulation block 26.

It follows that the demodulation process performed by the T2 frame signal processing apparatus 161 is basically the same as the demodulation process shown in FIG. 10, except that step S135 in FIG. 10 involves demodulating the T2 frame. Further descriptions of the steps involved are thus redundant and will not be given hereunder.

Likewise, the demodulation process performed by the FEF signal processing apparatus 162 is basically the same as the demodulation process shown in FIG. 9, except that step S119 in FIG. 9 involves demodulating the FEF part. Further descriptions of the steps involved are thus redundant and will not be given hereunder.

In the example of FIG. 11, as discussed above, the FEF signal processing apparatus 162 supplies the T2 frame signal processing apparatus 111 with the P1 information, P2 information, and FEF duration information necessary for demodulating the T2 frames. That means there is no need for the T2 frame signal processing apparatus 111 to incorporate the P1 detector, P2 detector, and FEF duration detection block for detecting the above-mentioned pieces of information. Furthermore, the T2 frame signal processing apparatus 111 can halt its circuit operations during the FEF duration.

As a result, the signal processing system 1 in FIG. 11 allows the circuits constituting the T2 frame signal processing apparatus 111 to be simplified appreciably. This in turn makes it possible for the apparatus 111 to reduce the scale of circuitry and lower power dissipation.

[Another Configuration Example of the Signal Processing Apparatus]

Figure 12:
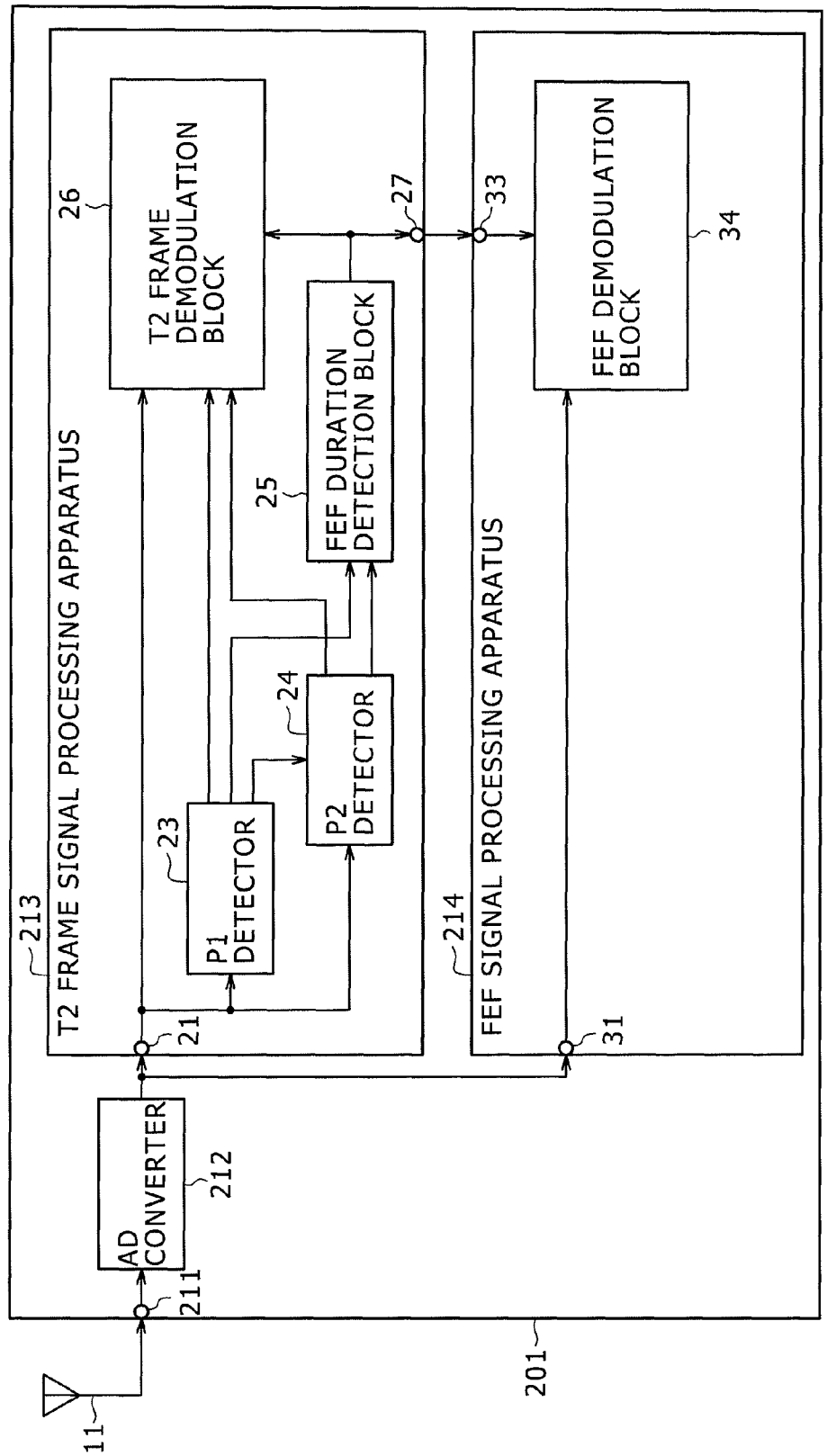
FIG. 12 is a block diagram showing a fifth configuration example of the signal processing system to which the embodiments of the present invention are applied.

FIG. 12 is a block diagram showing a fifth configuration example of the signal processing system to which the embodiments of the present invention are applied. Of the reference numerals in FIG. 12, those already used in FIG. 2 designate like or corresponding parts, and the descriptions of these parts will be omitted hereunder where redundant.

FIG. 12 shows a signal processing apparatus 201 acting as a signal processing system. The signal processing apparatus

201 in FIG. 12 receives a multiplexed signal composed of T2 frames and FEF parts and extracts these T2 frames and FEF parts individually from the received signal. More specifically, the signal processing apparatus 201 incorporates a T2 frame signal processing apparatus 213 that provides the function of receiving T2 frames, and an FEF signal processing apparatus 214 that offers the function of receiving FEF parts.

The signal processing system 201 in FIG. 12 is made up of an antenna 11, a signal input terminal 211, an A/D converter 212, the T2 frame signal processing apparatus 213, and the FEF signal processing apparatus 214.

The signal input terminal 211 inputs a multiplexed signal from the antenna 11 and forwards the signal to the A/D converter 22. Upon receipt of the multiplexed signal in analog form, the A/D converter 22 converts the signal to digital form. The A/D converter 22 feeds the digital multiplexed signal to the T2 frame signal processing apparatus 213 and FEF signal processing apparatus 214.

The T2 frame signal processing apparatus 213 detects P1, P2, and an FEF duration from the multiplexed signal coming from the A/D converter 22, and outputs information about the detected FEF duration to the FEF signal processing apparatus 214. Also, the T2 frame signal processing apparatus 213 demodulates the T2 frame using information about the detected P1, P2, and FEF duration. The demodulated T2 frame is output illustratively to a downstream decoder, not shown.

The T2 frame signal processing apparatus 213 is common to the T2 frame signal processing apparatus 12 in FIG. 2 in that it includes the P1 detector 23, P2 detector 24, FEF duration detection block 25, T2 frame demodulation block 26, and information output terminal 27. The T2 frame signal processing apparatus 213 is different from its counterpart 12 in FIG. 2 in that it excludes the A/D converter 22.

By determining that that FEF duration in the multiplexed signal from the A/D converter 22 which is indicated by the information from the T2 frame signal processing apparatus 213 is formed by an FEF part, the FEF signal processing apparatus 214 demodulates the FEF part. The data of the demodulated FEF part is output illustratively to a downstream decoder, not shown.

The FEF signal processing apparatus 214 is common to the FEF signal processing apparatus 13 in FIG. 2 in that it includes the signal input terminal 31, information input terminal 33, and FEF demodulation block 34. The FEF signal processing apparatus 214 is different from its counterpart 13 in FIG. 2 in that it excludes the A/D converter 32.

The demodulation process performed by the T2 frame signal processing apparatus 213 is basically the same as the demodulation process shown in FIG. 3 except that step S11 in FIG. 3 involving the A/D conversion is omitted. Further descriptions of the steps involved are thus redundant and will not be given hereunder.

Likewise, the demodulation process performed by the FEF frame signal processing apparatus 214 is basically the same as the demodulation process shown in FIG. 4 except that step S31 in FIG. 4 involving the A/D conversion is omitted. Further descriptions of the steps involved are thus redundant and will not be given hereunder.

As described above, the signal processing system of the embodiments of the present invention may be constituted as a single apparatus possessing both the function of receiving T2 frames and the function of receiving FEF parts.

In the foregoing paragraphs, the configuration examples were shown to receive the analog signal. Alternatively, if a digital signal is to be received, these examples need only exclude the A/D converter; the remaining components may be utilized as they are.

In the foregoing paragraphs, the configuration examples were shown to receive the multiplexed signal composed of T2 frames and FEF parts. However, the T2 frames and FEF parts are not limitative of the embodiments of the present invention. The number of signals to be multiplexed is not limited to two. In other words, this invention can be applied to any apparatus for receiving a multiplexed signal composed of a plurality of signals each having a different structure, the apparatus extracting the individual signals from the received multiplexed signal.

<2. Second Embodiment>

[Configuration Examples of the Reception System]

Figure 13:
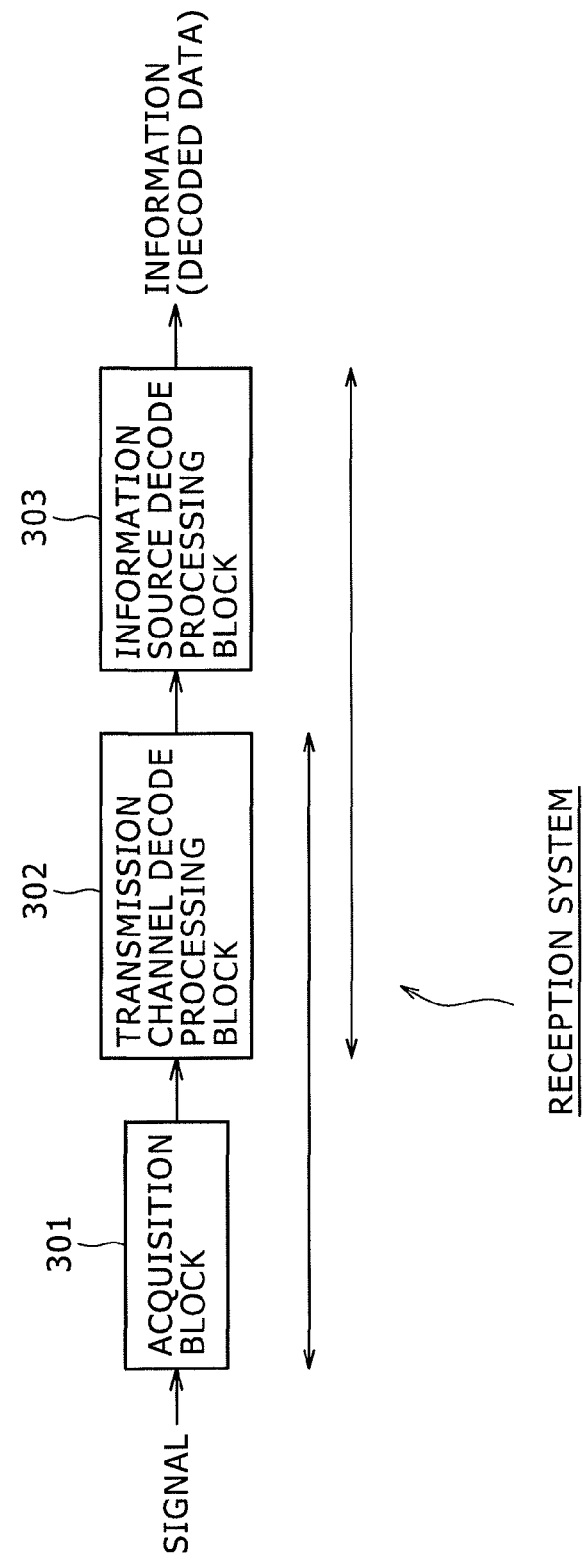
FIG. 13 is a block diagram showing a first configuration example of a reception system to which the embodiments of the present invention are applied.

FIG. 13 is a block diagram showing a first configuration example of the reception system to which the embodiments of the present invention are applied.

In FIG. 13, the reception system is made up of an acquisition block 301, a transmission channel decode processing block 302, and an information source decode processing block 303.

The data making up illustratively TV programs is acquired in the form of OFDM signals through OFDM. As shown in FIG. 1, the OFDM signal is a multiplexed signal having T2 frames and FEF parts multiplexed therein when transmitted.

The multiplexed signal is transmitted illustratively by broadcasting stations and Web servers, not shown, and acquired by the acquisition block 301.

The acquisition block 301 acquires the multiplexed signal typically via transmission channels such as terrestrial digital broadcasts, satellite digital broadcasts, CATV (cable television) networks, and other network including the Internet. The multiplexed signal thus acquired is forwarded to the transmission channel decode processing block 302.

Where the multiplexed signal is broadcast illustratively by broadcasting stations using terrestrial waves, satellite waves, or CATV networks, the acquisition block 301 may be composed of a tuner or a set-top box (STB). Where the multiplexed signal is transmitted illustratively by Web servers on a multicast basis such as IPTV (Internet Protocol Television), the acquisition block 301 may be formed by a network interface such as NIC (network interface card).

The transmission channel decode processing block 302 performs a transmission channel decoding process on the signal acquired by the acquisition block 301 over the transmission channel, the transmission channel decoding process including at least demodulation processing such as FFT computations and equalization. The signal resulting from the transmission channel decoding process is sent to the information source decode processing block 303.

The signal acquired by the acquisition block 301 over the transmission channel is a distorted signal having been influenced by transmission channel characteristics. The transmission channel decode processing block 302 performs demodulation processing such as FEF computations and equalization on the signal thus acquired.

The transmission channel decoding process may include the process of correcting errors that may have occurred on the transmission channel. LDPC coding and Reed-Solomon coding are typical examples of error-correcting coding.

The information source decode processing block 303 performs an information source decoding process on the signal having undergone the transmission channel decoding process, the information source decoding process including at least the process of expanding compressed information to restore original information.

That is, there may be cases where the signal acquired by the acquisition block 301 may have been compression-coded in order to reduce the amount of the data such as images and sounds constituting the information of interest. In such cases, the information source decode processing block 303 performs on the compression-coded signal the information source decoding process including the process of expanding compressed information to restore original information (expansion process).

If the signal acquired by the acquisition block 301 over the transmission channel is not compression-coded, the information source decode processing block 303 does not perform the process of expanding the compressed information into the original information.

An example of the expansion process is MPEG decoding. The transmission channel decoding process may include descrambling in addition to the expansion process.

In the reception system structured as described above, the acquisition block 301 may illustratively carry out compression coding such as MPEG coding on the data making up images and sounds. The signal having undergone error-correcting coding may also be acquired over the transmission channel and forwarded to the transmission channel decode processing block 302.

The transmission channel decode processing block 302 performs, on the signal from the acquisition block 301, the same demodulation process as that carried out by at least one of the signal processing apparatuses constituting the signal processing system shown in FIG. 2, 5, 8, 11, or 12 as the demodulation apparatus. The signal resulting from the demodulation process is supplied to the information source decode processing block 303.

The information source decode processing block 303 performs the information source decoding process such as MPEG decoding on the signal coming from the transmission channel decode processing block 302. Images or sounds resulting from the decoding process are output from the information source decode processing block 303.

The reception system of FIG. 13 described above may be applied illustratively to TV tuners for receiving digital TV broadcasts.

The acquisition block 301, transmission channel decode processing block 302, and information source decode processing block 303 may each be structured as an independent apparatus (a hardware module such as an IC (integrated circuit) or a software module).

Some or all of the acquisition block 301, transmission channel decode processing block 302, and information source decode processing block 303 may be set up in combination as an independent apparatus. That is, a set of the acquisition block 301 and transmission channel decode processing block 302, a set of the transmission channel decode processing block 302 and information source decode processing block 303, or a set of the acquisition block 301, transmission channel decode processing block 302, and information source decode processing block 303 may be formed into a single independent apparatus.

Figure 14:
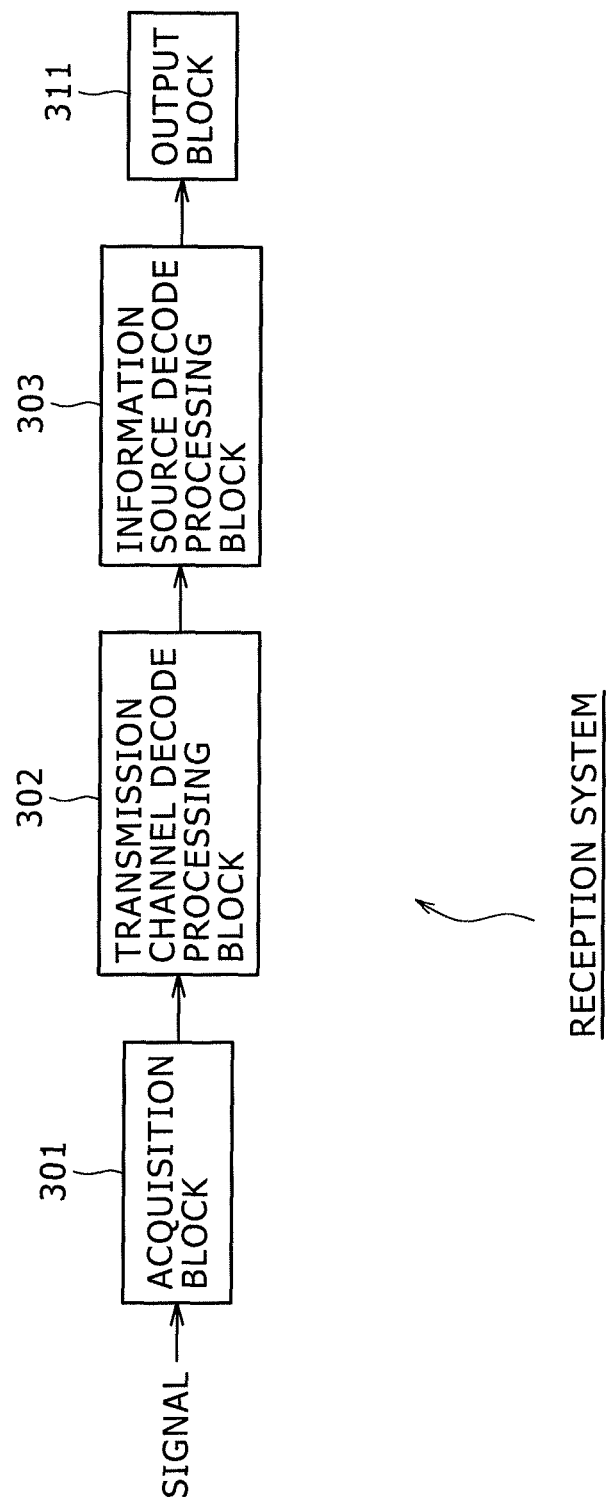
FIG. 14 is a block diagram showing a second configuration example of the reception system to which the embodiments of the present invention are applied.

FIG. 14 is a block diagram showing a second configuration example of the reception system to which the embodiments of the present invention are applied.

Of the reference numerals in FIG. 14, those already used in FIG. 13 designate like or corresponding parts, and the descriptions of these parts will be omitted hereunder where redundant.

The reception system in FIG. 14 is common to the reception system in FIG. 13 in that it includes the acquisition block 301, transmission channel decode processing block 302, and information source decode processing block 303. The reception system in FIG. 14 is different from its counterpart in FIG. 13 in that it additionally contains an output block 311.

The output block 311 is illustratively composed of a display device for displaying images and/or of speakers for outputting sounds. As such, the output block 311 outputs the images and sounds represented by the signal output from the information source decode processing block 303. In short, what the output block 311 does is to display images and/or output sounds.

The above-described reception system in FIG. 14 may be applied illustratively to TV sets for receiving digital TV broadcasts or to radio receivers for receiving radio broadcasts.

If the signal acquired by the acquisition block 301 is not found to be compression-coded, then the signal output by the transmission channel decode processing block 302 is sent directly to the output block 311.

Figure 15:
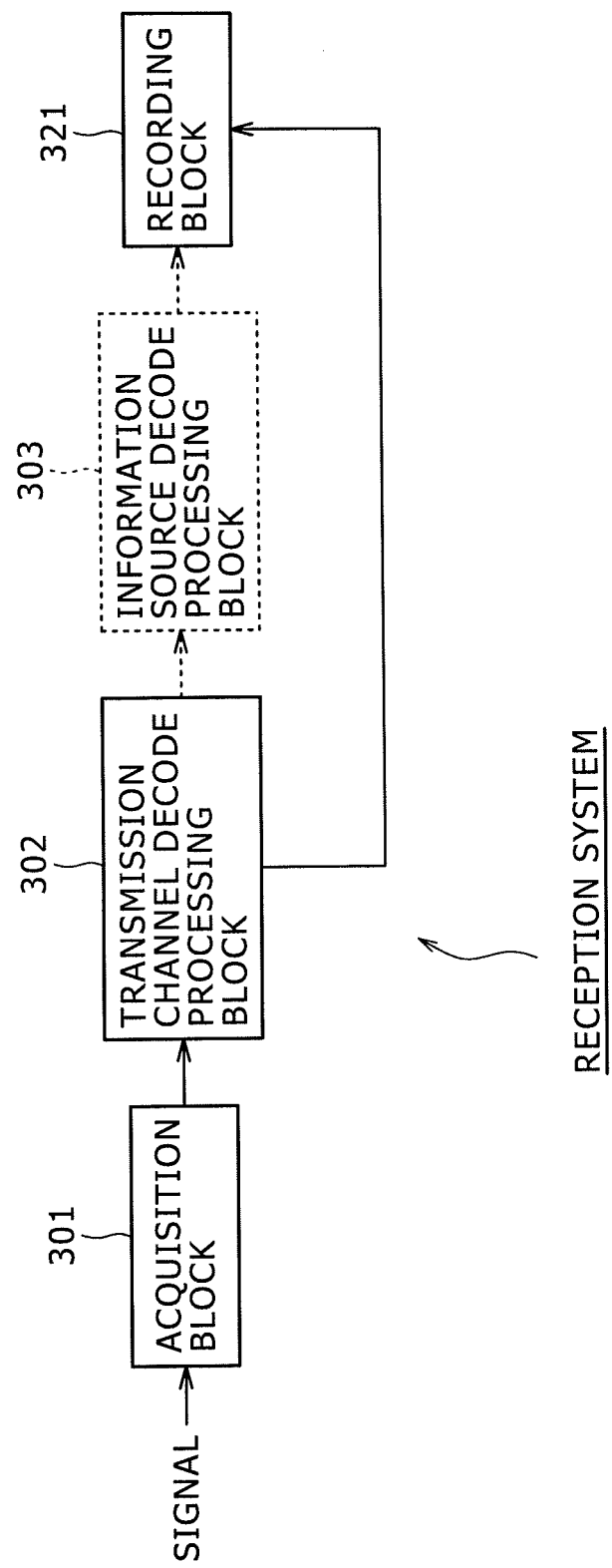
FIG. 15 is a block diagram showing a third configuration example of the reception system to which the embodiments of the present invention are applied.

FIG. 15 is a block diagram showing a third configuration example of the reception system to which the embodiments of the present invention are applied.

Of the reference numerals in FIG. 15, those already used in FIG. 13 designate like or corresponding parts, and the descriptions of these parts will be omitted hereunder where redundant.

The reception system in FIG. 15 is common to the reception system in FIG. 13 in that it includes the acquisition block 301 and transmission channel decode processing block 302.

The reception system in FIG. 15 is different from its counterpart in FIG. 13 in that it excludes the information source decode processing block 303 and additionally contains a recording block 321.

The recording block 321 records (i.e., stores) the signal output from the transmission channel decode processing block 302 (such as TS packets of MPEG transport streams) to recording (i.e., storage) media including optical disks, hard disks (magnetic disks), and flash memories.

The above-outlined reception system in FIG. 15 may be applied illustratively to recorders for recording TV broadcasts.

In FIG. 15, the reception system may be structured alternatively to include the information source decode processing block 303. In this setup, the information source decode processing block 303 performs the information source decoding process on the received signal, so that the images and sounds acquired from the decoded signal can be recorded by the recording block 321.

In the foregoing paragraphs, the embodiments of the present invention were described as applied to the reception apparatus for receiving the OFDM signal having T2 frames and FEF parts multiplexed therein when transmitted in accordance with DVB-T.2. However, this is not limitative of the embodiments of the present invention. Alternatively, the invention can be applied to any apparatus for receiving a multiplexed signal composed of a plurality of signals each having a different structure, the apparatus extracting the individual signals from the received multiplexed signal.

The series of the processes described above may be executed either by hardware or by software. Where the processes are to be carried out by software, the programs constituting the software are installed into suitable computers for process execution. Such computers include one with the relevant software installed beforehand in its dedicated hardware, and a general-purpose personal computer or like equipment capable of executing diverse functions based on the programs installed therein.

Figure 16:
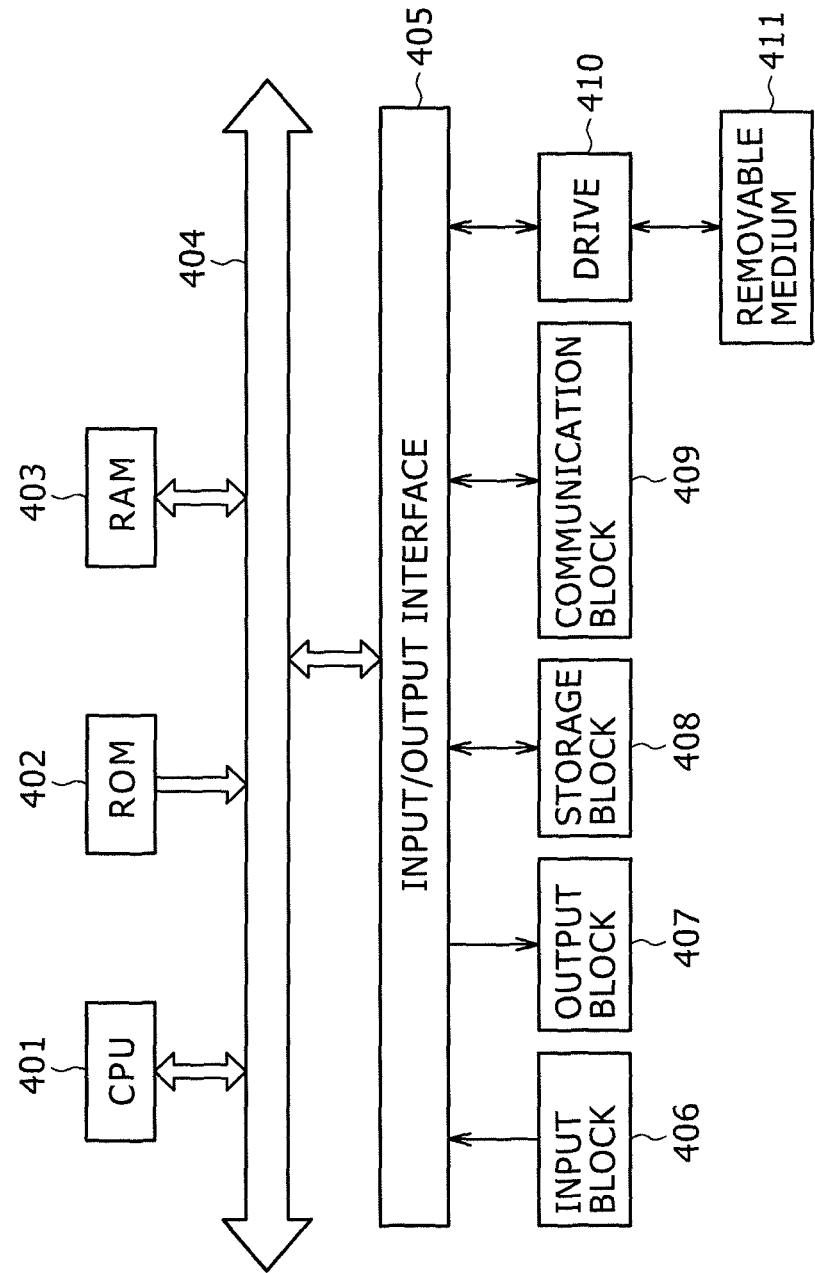
FIG. 16 is a block diagram showing a typical hardware structure of a computer.

FIG. 16 is a block diagram showing a typical hardware structure of a computer that carries out the above-described series of processes using programs.

In the computer, a CPU (central processing unit) 401, a ROM (read only memory) 402, and a RAM (random access memory) 403 are interconnected by a bus 404.

An input/output interface 405 is also connected to the bus 404. The input/output interface 405 is connected with an input block 406, an output block 407, a storage block 408, a communication block 409, and a drive 410.

The input block 406 is illustratively made up of a keyboard, a mouse, and a microphone. The output block 407 is typically composed of a display and speakers. The storage block 408 is generally formed by a hard disk or other nonvolatile memory. The communication block 409 is typically constituted by a network interface. The drive 410 drives removable media 411 such as magnetic disks, optical disks, magneto-optical disks, or semiconductor memories.

In the computer structured as outlined above, the CPU 401 performs the above-described series of processes illustratively by having the relevant programs loaded from the storage block 408 into the RAM 403 for execution through the input/output interface 405 and bus 404.

Illustratively, the programs to be executed by the computer (i.e., by CPU 401) may be offered recorded on the removable media 411 as package media. Alternatively, the programs may be offered transferred through wired or wireless transmission media including local area networks, the Internet, and digital broadcasts.

In the computer, the programs may be installed from the removable media 411 placed in the drive 410 into the storage block 408 through the input/output interface 405. Alternatively, the programs may be received by the communication block 409 via wired or wireless transmission media and installed into the storage block 408. As another alternative, the programs may be preinstalled in the ROM 402 or storage block 408.

Also, the programs for execution by the computer may be processed in the depicted sequence of this specification (i.e., on a time series basis), in parallel, or in otherwise appropriately timed fashion such as when they are invoked.

It should be understood by those skilled in the art that various modifications, combinations, sub-combinations and alterations may occur depending on design requirements and other factor in so far as they are within the scope of the appended claims or the equivalents thereof.

The present application contains subject matter related to that disclosed in Japanese Priority Patent Application JP 2009-187804 filed in the Japan Patent Office on Aug. 13, 2009, the entire content of which is hereby incorporated by reference.

What is claimed is:

1. A signal processing apparatus comprising:
first detection means for detecting a first preamble signal from a multiplexed signal composed of a plurality of signals comprised of a number of signal types and each signal holding said first preamble signal and each signal type having a different structure;
second detection means configured such that if information which is included in said first preamble signal detected by said first detection means and which identifies each of said plurality of signals indicates a first signal, then said second detection means detects a second preamble signal following said first preamble signal;
duration detection means for detecting a duration of a second signal in said multiplexed signal based on information included in said second preamble signal detected by said second detection means;
duration information output means for outputting information about the second signal duration detected by said duration detection means, to another signal processing apparatus configured to demodulate one of said first and said second signals in said multiplexed signal; and
demodulation means for demodulating the other of said first and said second signals in said multiplexed signal based on the information included in said first preamble signal, on the information included in said second preamble signal, and on the information about said second signal duration detected by said duration detection means.

2. The signal processing apparatus according to claim 1, further comprising analog-to-digital conversion means for converting said multiplexed signal into a digital signal.

3. The signal processing apparatus according to claim 2, further comprising signal output means for outputting said digital signal converted by said analog-to-digital conversion means to said another signal processing apparatus.

4. The signal processing apparatus according to claim 1, further comprising first information output means for outputting the information included in said second preamble signal to said another signal processing apparatus.

5. The signal processing apparatus according to claim 4, further comprising second information output means for outputting the information included in said first preamble signal to said another signal processing apparatus.

6. A signal processing method comprising the steps of;
causing a signal processing apparatus to detect a first preamble signal from a multiplexed signal composed of a plurality of signals comprised of a number of signal types and each signal holding said first preamble signal and each signal type having a different structure;
if information which is included in the detected first preamble signal and which identifies each of said plurality of signals indicates a first signal, then causing said signal processing apparatus to detect a second preamble signal following said first preamble signal;
causing said signal processing apparatus to detect a duration of a second signal in said multiplexed signal based on information included in the detected second preamble signal;
causing said signal processing apparatus to output information about the detected second signal duration to another signal processing apparatus configured to demodulate one of said first and said second signals in said multiplexed signal; and
causing said signal processing apparatus to demodulate the other of said first and said second signals in said multiplexed signal based on the information included in said first preamble signal, on the information included in said second preamble signal, and on the information about said second signal duration.

7. A signal processing apparatus comprising;
duration information input means configured such that if information which is included in a first preamble signal detected from a multiplexed signal composed of a plurality of signals comprised of a number of signal types and each signal holding said first preamble signal and each signal type having a different structure and which identifies each of said plurality of signals indicates a first signal, then said duration information input means inputs information about a duration of a second signal detected from said multiplexed signal based on information included in a second preamble signal detected following said first preamble signal, the information about the second signal duration being input from another signal processing apparatus configured to demodulate one of said first and said second signals in said multiplexed signal; and demodulation means for demodulating the other of said first and said second signals in said multiplexed signal based on the second signal duration information input through said information input means.

8. The signal processing apparatus according to claim 7, further comprising analog-to-digital conversion means for convening said multiplexed signal into a digital signal;
wherein said demodulation means demodulates said other signal in said multiplexed signal using said digital signal convened by said analog-to-digital conversion means.

9. The signal processing apparatus according to claim 7, further comprising signal input means for inputting a digital signal converted from said multiplexed signal from said another signal processing apparatus;
wherein said demodulation means demodulates said other signal in said multiplexed signal using said digital signal input through said signal input means.

10. The signal processing apparatus according to claim 7, further comprising first information input means for inputting the information included in said second preamble signal from said another signal processing apparatus;
wherein said demodulation means demodulates said other signal in said multiplexed signal based also on the information included in said second preamble signal.

11. The signal processing apparatus according to claim 10, further comprising second information input means for inputting the information included in said first preamble signal from said another signal processing apparatus;
wherein said demodulation means demodulates said other signal in said multiplexed signal based also on the information included in said first preamble signal.

12. A signal processing method comprising the steps of:
if information which is included in a first preamble signal detected from a multiplexed signal composed of a plurality of signals comprised of a number of signal types and each signal holding said first preamble signal and each signal type having a different structure and which identifies each of said plurality of signals indicates a first signal, then causing a signal processing apparatus to input information about a duration of a second signal detected from said multiplexed signal based on information included in a second preamble signal detected following said first preamble signal, the information about the second signal duration being input from another signal processing apparatus configured to demodulate one of said first and said second signals in said multiplexed signal; and
causing said signal processing apparatus to demodulate the other of said first and said second signals in said multiplexed signal based on the second signal duration information that has been input.

13. A signal processing apparatus comprising:
a first signal processing block configured to extract one of a first and a second signal from a multiplexed signal composed of a plurality of signals comprised of a number of signal types and each signal holding a first preamble signal and each signal type having a different structure; and
a second signal processing block configured to extract the other of said first and said second signals from said multiplexed signal; wherein said first signal processing block includes
first detection means for detecting said first preamble signal from said multiplexed signal,
second detection means configured such that if information which is included in said first preamble signal detected by said first detection means and which identifies each of said plurality of signals indicates a first signal, then said second detection means detects a second preamble signal following said first preamble signal,
duration detection means for detecting a duration of a second signal in said multiplexed signal based on information included in said second preamble signal detected by said second detection means,
duration information output means for outputting information about the second signal duration detected by said duration detection means, to said second signal processing block, and
demodulation means for demodulating said one of said first and said second signals in said multiplexed signal based on the information included, in said first preamble signal, on the information included in said second preamble signal, and on the information about said second signal duration detected by said duration detection means, and
said second signal processing block includes
duration information input means for inputting the second signal duration information from said first signal processing block; and
demodulation means for demodulating said other of said first and said second signals in said multiplexed signal based on said second signal duration information input through said duration information input means.

14. A signal processing method for use with a signal processing apparatus having a first and a second signal processing block, said signal processing method comprising the steps of:
causing said first signal processing block to detect a first preamble signal from a multiplexed signal composed of a plurality of signals comprised of a number of signal types and each signal holding said first preamble signal and each signal type having a different structure;
if information which is included in said first preamble signal and which identifies each of said plurality of signals indicates a first signal, then causing said first signal processing block to detect a second preamble signal following said first preamble signal;
causing said first signal processing block to detect a duration of a second signal detected from said multiplexed signal based on information included in the detected second preamble signal;
causing said first signal processing block to output information about the detected second signal duration to said second signal processing block;
causing said first signal processing block to demodulate one of said first and said second signals in said multiplexed signal based on the information included in said first preamble signal, on the information included in said second preamble signal, and on the information about said second signal duration;
causing said second signal processing block to input the information about said second signal duration from said first signal processing block; and
causing said second signal processing block to demodulate the other of said first and said second signals in said multiplexed signal based on the input information about said second signal duration that has been input.

15. A reception system comprising:

an acquisition block configured to acquire a signal via a transmission channel; and a transmission channel decode processing block configured to perform a transmission channel decoding process on the signal acquired via said transmission channel, said transmission channel decoding process including at least a demodulation process; wherein said signal acquired via said transmission channel is a multiplexed signal composed of a plurality of signals comprised of a number of signal types and each signal holding a first preamble signal and each signal type having a different structure, and said transmission channel decode processing block includes first detection means for detecting said first preamble signal from said multiplexed signal, second detection means configured such that if information which is included in said first preamble signal detected by said first detection means and which identifies each of said plurality of signals indicates a first signal, then said second detection means detects a second preamble signal following said first preamble signal, duration detection means for detecting a duration of a second signal in said multiplexed signal based on information included in said second preamble signal detected by said second detection means, duration information output means for outputting information about the second signal duration detected by said duration detection means, to an apparatus configured to demodulate one of said first and said second signals in said multiplexed signal, and demodulation means for demodulating the other of said first and said second signals in said multiplexed signal based on the information included in said first preamble signal, on the information included in said second preamble signal, and on the information about said second signal duration detected by said duration detection means.

16. A reception system comprising:

a transmission channel decode processing block configured to perform a transmission channel decoding process on a signal acquired via a transmission channel, said transmission channel decoding process including at least a demodulation process; and an information source decode processing block configured to perform an information source decoding process on the signal having undergone said transmission channel decoding process, said information source decoding process including at least the process of expanding compressed information to restore original information; wherein said signal acquired via said transmission channel is a multiplexed signal composed of a plurality of signals comprised of a number of signal types and each signal holding a first preamble signal and each signal type having a different structure, and said transmission channel decode processing block includes first detection means for detecting said first preamble signal from said multiplexed signal, second detection means configured such that if information which is included in said first preamble signal detected by said first detection means and which identifies each of said plurality of signals indicates a first signal, then said second detection means detects a second preamble signal following said first preamble signal, duration detection means for detecting a duration of a second signal in said multiplexed signal based on information included in said second preamble signal detected by said second detection means, duration information output means for outputting information about the second signal duration detected by said duration detection means, to an apparatus configured to demodulate one of said first and said second signals in said multiplexed signal, and demodulation means for demodulating the other of said first and said second signals in said multiplexed signal based on the information included in said first preamble signal, on the information included in said second preamble signal, and on the information about said second signal duration detected by said duration detection means.

17. A reception system comprising:

a transmission channel decode processing block configured to perform a transmission channel decoding process on a signal acquired via a transmission channel, said transmission channel decoding process including at least a demodulation process; and an output block configured to output an image or a sound based on the signal having undergone said transmission channel decoding process; wherein said signal acquired via said transmission channel is a multiplexed signal composed of a plurality of signals comprised of a number of signal types and each signal holding a first preamble signal and each signal type having a different structure, and said transmission channel decode processing block includes first detection means for detecting said first preamble signal from said multiplexed signal, second detection means configured such that if information which is included in said first preamble signal detected by said first detection means and which identifies each of said plurality of signals indicates a first signal, then said second detection means detects a second preamble signal following said first preamble signal, duration detection means for detecting a duration of a second signal in said multiplexed signal based on information included in said second preamble signal detected by said second detection means, duration information output means for outputting information about the second signal duration detected by said duration detection means, to an apparatus configured to demodulate one of said first and said second signals in said multiplexed signal, and demodulation means for demodulating the other of said first and said second signals in said multiplexed signal based on the information included in said first preamble signal, on the information included in said second preamble signal, and on the information about said second signal duration detected by said duration detection means.

18. A reception system comprising:

a transmission channel decode processing block configured to perform a transmission channel decoding process on a signal acquired via a transmission channel, said transmission channel decoding process including at least a demodulation process; and a recording block configured to record the signal having undergone said transmission channel decoding process; wherein said signal acquired via said transmission channel is a multiplexed signal composed of a plurality of signals comprised of a number of signal types and each signal holding a first preamble signal and each signal type having a different structure, and said transmission channel decode processing block includes first detection means for detecting said first preamble signal from said multiplexed signal, second detection means configured such that if information which is included in said first preamble signal detected by said first detection means and which identifies each of said plurality of signals indicates a first signal, then said second detection means detects a second preamble signal following said first preamble signal, duration detection means for detecting a duration of a second signal in said multiplexed signal based on information included in said second preamble signal detected by said second detection means, duration information output means for outputting information about the second signal duration detected by said duration detection means, to an apparatus configured to demodulate one of said first and said second signals in said multiplexed signal, and demodulation means for demodulating the other of said first and said second signals in said multiplexed signal based on the information included in said first preamble signal, on the information included in said second preamble signal, and on the information about said second signal duration detected by said duration detection means.

* * * * *